United States Patent [19]
Volk et al.

[11] Patent Number: 5,687,331
[45] Date of Patent: Nov. 11, 1997

[54] METHOD AND SYSTEM FOR DISPLAYING AN ANIMATED FOCUS ITEM

[75] Inventors: Patrick M. Volk, Kirkland; Michael Breed Robin, Redmond; Edwin Thorne, III, Seattle; JoGene Kapell, Bellevue, all of Wash.

[73] Assignee: Microsoft Corporation, Redmond, Wash.

[21] Appl. No.: 510,965

[22] Filed: Aug. 3, 1995

[51] Int. Cl.⁶ .................................................. G06F 3/00
[52] U.S. Cl. .................. 395/327; 395/977; 395/962
[58] Field of Search .................................. 395/159, 333, 395/334, 339, 349, 327, 977, 962

[56] References Cited

U.S. PATENT DOCUMENTS

| | | | |
|---|---|---|---|
| 5,479,602 | 12/1995 | Baecker et al. | 395/159 |
| 5,491,795 | 2/1996 | Beaudet et al. | 395/159 |
| 5,524,195 | 6/1996 | Clanton, III et al. | 395/159 X |
| 5,555,496 | 9/1996 | Tackbary et al. | 395/227 |
| 5,564,004 | 10/1996 | Grossman et al. | 395/159 |

*Primary Examiner*—Raymond J. Bayerl
*Assistant Examiner*—A. Katbab
*Attorney, Agent, or Firm*—Jones & Askew, LLP

[57] ABSTRACT

A viewer interface is disclosed for use in an interactive television network operative for providing an animated focus item in association with a control item to indicate that the control item is in a state responsive to commands from a user input device. An "animation" is any form of highlighting that is non-static, including but not limited to flashing, varying illumination, varying size, varying shape, varying position, varying color, varying display components, a moving and/or changing cartoon type image, a video image, a sound track, or a combination of these elements. Selection of the control item to receive focus and selection of options presented by control items having focus are accomplished by viewer interaction with the remote control unit, and such selections do not require a keyboard or mouse to indicate the viewer's desire to change the focus from one control item to another or to select an option. The user interface is also suitable for use in a general computing environment as well as in an interactive television environment.

77 Claims, 21 Drawing Sheets

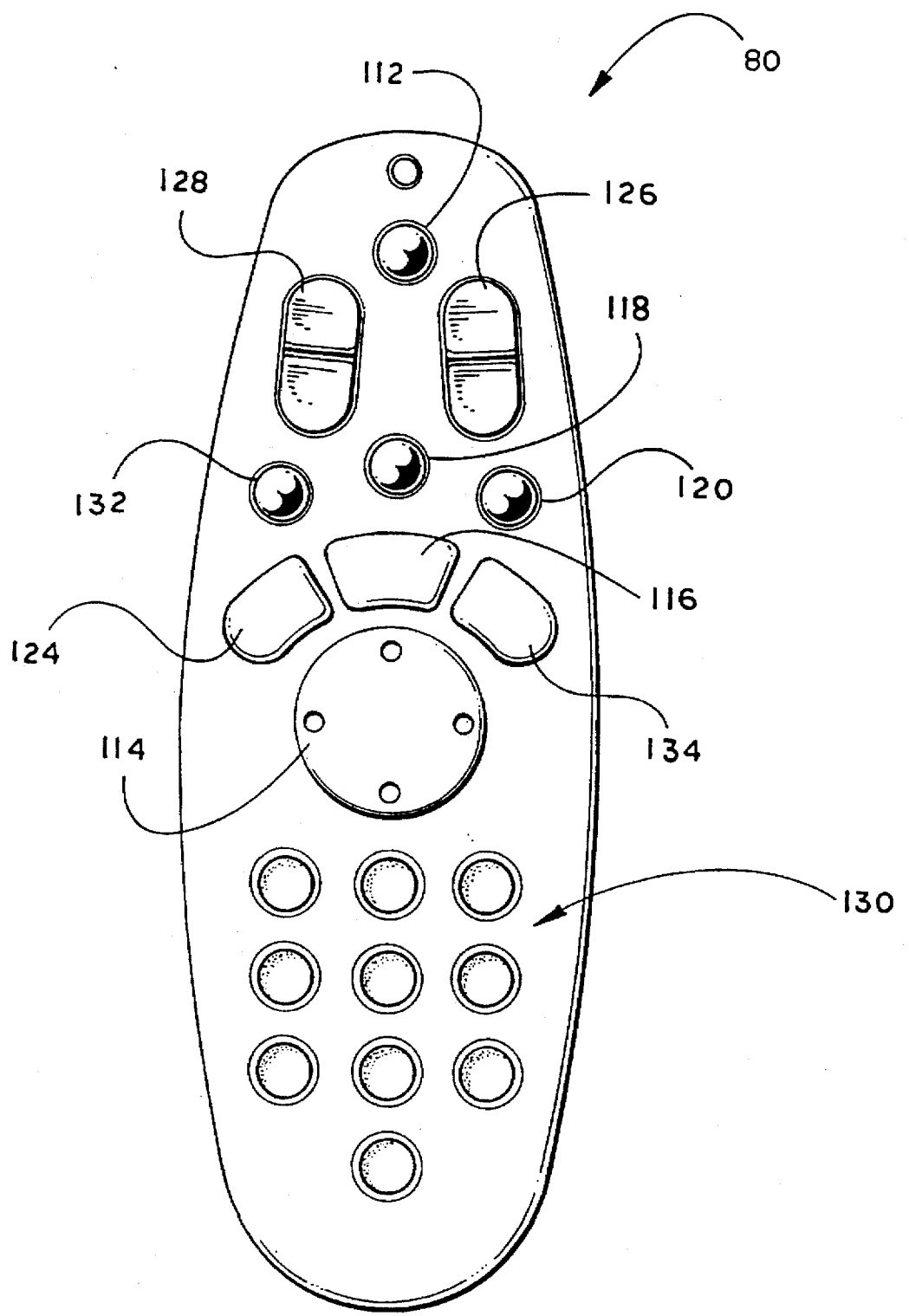

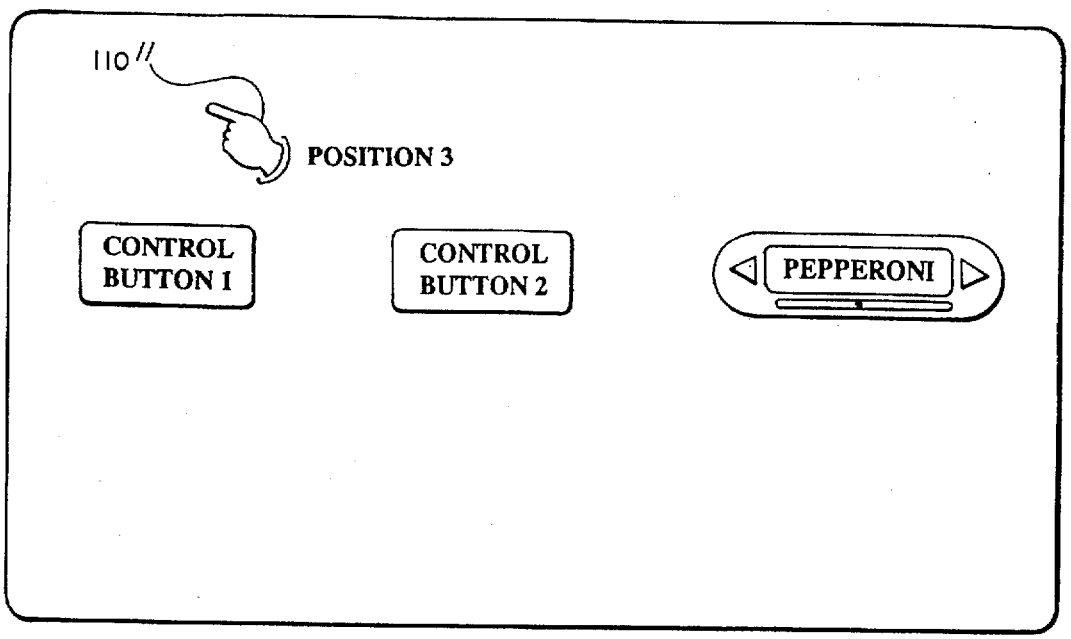
Fig_5C
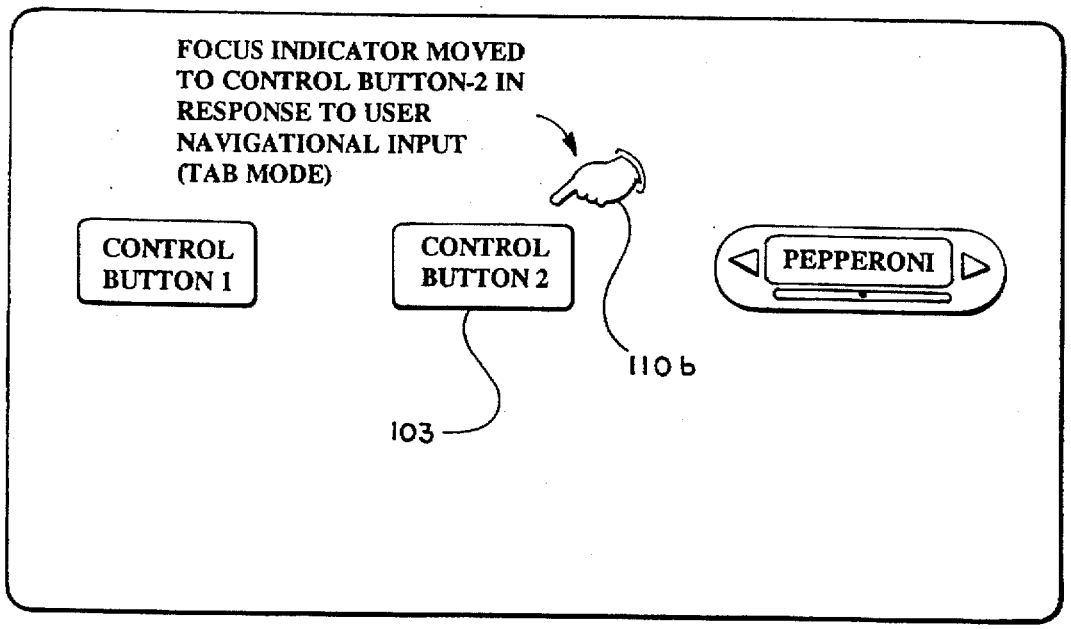
Fig_5D

PUSH BUTTONS
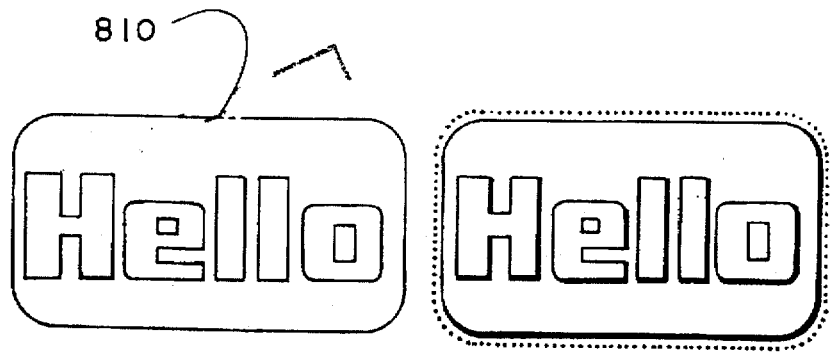
BUTTON IN ENABLED (LEFT) AND PUSHED (RIGHT) STATES
SPIN DIALS
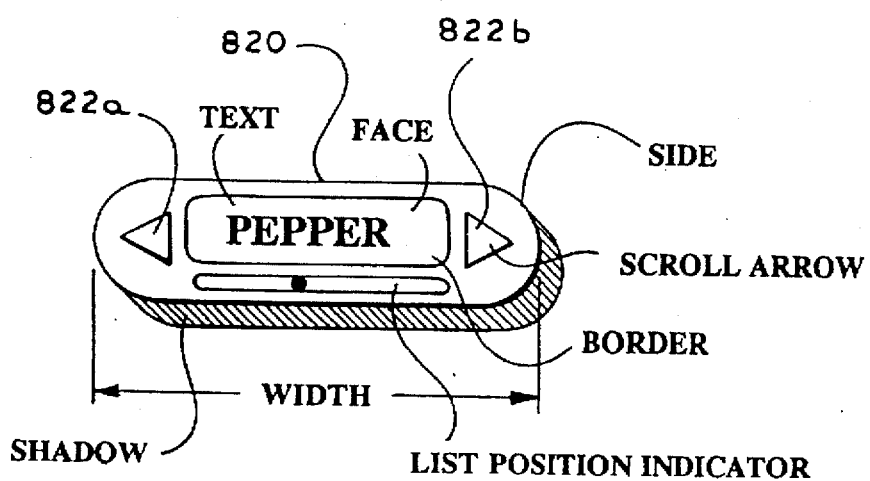
SPIN DIAL COMPONENTS

LIST BOXES
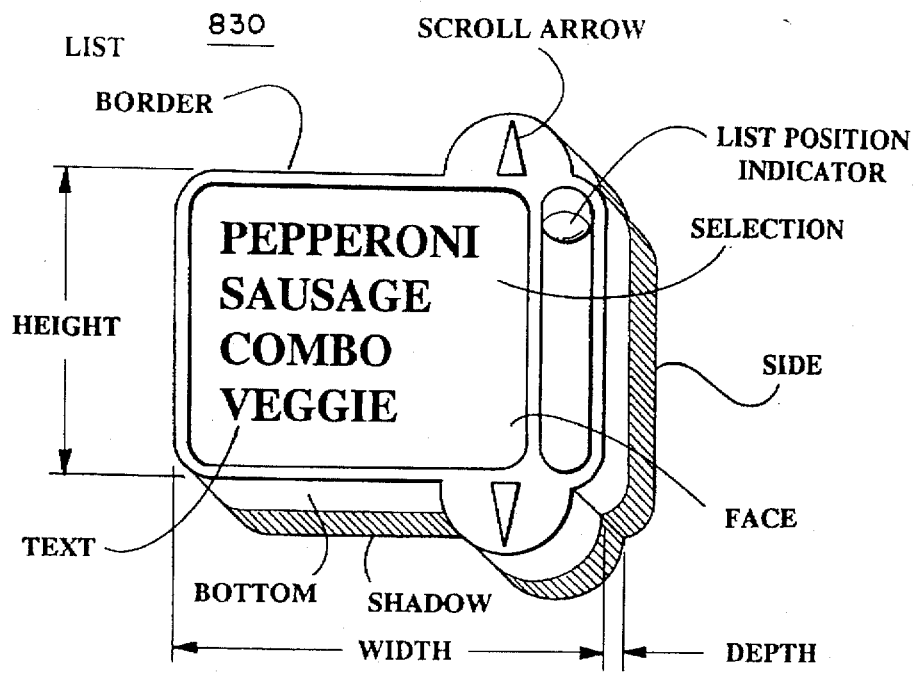
TEXT EDIT CONTROL
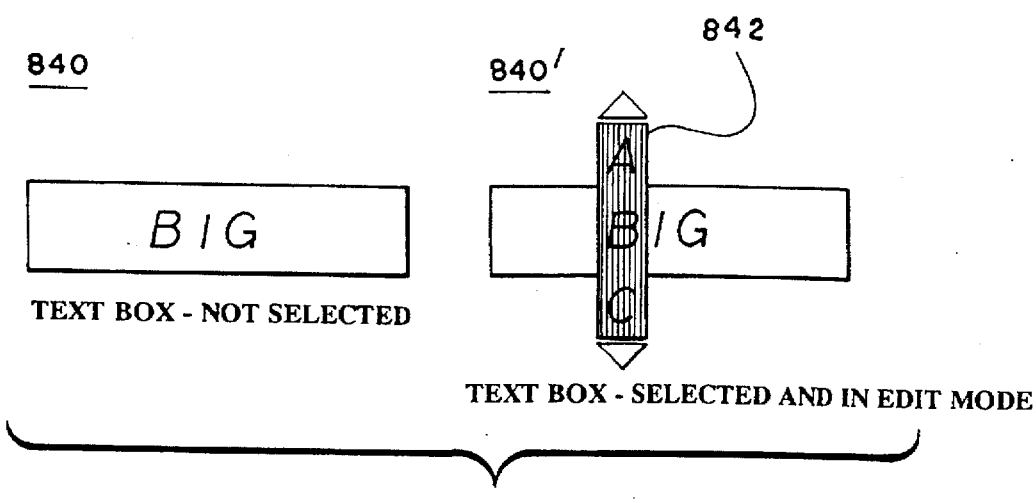

Interactive Television System

1430

Display Focus Item
Associated with Control
Object Holding Focus

Animate Focus — 1431

Link Focus Object to
Control Object — 1438

Return

*Fig. 14*

METHOD AND SYSTEM FOR DISPLAYING AN ANIMATED FOCUS ITEM

TECHNICAL FIELD

The present invention relates to a graphical viewer interface for an interactive medium of communication. More particularly, the present invention relates to a method in an interactive television system for using animation to indicate that a particular control item among a plurality of control items displayed on a graphical viewer interface is currently in a state responsive to commands from a user input device.

BACKGROUND OF THE INVENTION

Cable television systems, sometimes referred to as community-antenna television (CATV) systems, are broadband communications networks of coaxial cable and optical fiber that distribute video, audio, and data signals to the homes or businesses of subscribers. In a typical CATV system, a single advantageously located antenna array feeding a cable network supplies each individual subscriber with a usable television signal.

CATV networks have experienced enormous growth and expansion in the United States, particularly in urban areas. It is estimated that CATV networks currently pass near and are accessible to approximately 90% of the population in the United States, with approximately 60–65% of all households actually being connected to such communications networks. While cable systems originally had very simple architectures and provided a limited number of different television signals, the increase in the number of television broadcasters, owners, and services over the last several decades has resulted in much more complex modern cable distribution systems.

A typical CATV system for the delivery of television programming to subscribers comprises three main elements: a headend, a distribution system, and subscriber drops.

The "headend" is a signal reception and processing center that collects, organizes, and distributes signals. The headend receives satellite-delivered video and audio programming, over-the-air broadcast television station signals, and network feeds delivered by terrestrial microwave and other communication systems. In addition, headends may inject local broadcast programming into the package of signals sent to subscribers, such as commercials and live programs created in a television studio.

The "distribution system" carries the signals from the headend to a number of distribution points in a community and, in turn, distributes these signals to individual neighborhoods for delivery to subscribers. A modern distribution system typically comprises a combination of coaxial cable and optical fibers, with trunk amplifiers periodically spaced to compensate for attenuation of the signals along the line.

"Subscriber drops" are taps in the distribution system that feed individual coaxial cable lines into subscribers' television sets or subscriber set-top terminals, often referred to as "subscriber premises equipment" or "customer premises equipment" ("CPE").

CATV distribution systems were originally designed to distribute television signals in the "downstream" direction only, i.e., from a central headend location to multiple subscriber locations, also referred to as the "forward" path. For downstream transmissions, typical CATV systems provide a series of video channels, each 6 MHz in bandwidth, which are frequency division multiplexed across the forward band, in the 50 MHz to 550 MHz region of the frequency spectrum. As optical fiber more deeply penetrates the service areas with hybrid optical fiber/coaxial cable (HFC) configurations, the bandwidth of the coaxial cable portion is expected to increase to over 1 GHz, thereby increasing the number of available channels for potential services.

The advent of pay-per-view services and other interactive television applications has fueled the development of bi-directional or "two-way" cable systems that also provide for the transmission of signals from the subscriber locations back to the headend via an "upstream" direction or a "reverse" path. By upgrading CATV systems employing relatively limited bandwidth coaxial cable with broadband distribution networks having HFC configurations, multiple service operators (MSOs) can use the additional channels gained by this wider bandwidth network to provide many new subscriber services. This ever-expanding deployment of fiber optic technology supports the implementation of an "interactive network" to allow a subscriber to obtain desired services or programming at a time and date specified by the subscriber. Indeed, it is feasible that this interactive network will have sufficient bandwidth to supply hundreds of channels of programming information, thereby leading to an explosion of program options available to subscribers. Potential subscriber services supported by this interactive network include Movies on Demand (MOD) or Video on Demand (VOD), interactive computing, shopping, entertainment, and other related services.

The delivery of a variety of interactive services via a broadband network distribution system raises the critical issue of defining an efficient mechanism for presenting both operation and program-related information to an audience of possible consumers representing diverse technological backgrounds and interests. From an ergonomic perspective, this "viewer interface" for such an interactive network should appeal to a "typical" viewer of standard broadcast television programs and should be easy for this imagined person to understand and to use. Because computer users reflect only a portion of the overall audience for interactive services, it is desirable that the features of this viewer interface be based upon the assumption that the typical viewer is not familiar with user interface customs that are otherwise acceptable and understood by the computer literate community. In addition, the functions of the viewer interface should be controllable with a control device familiar to this typical television viewer, such as a handheld remote control. This viewer interface also should be readily readable from an acceptable viewing distance that typically separates the viewer from a television screen.

The typical television viewer is accustomed to viewing sophisticated graphics within broadcast programs that are produced with complex and expensive production equipment. It is desirable for the viewer interface of an interactive television network to support similar graphical features, including visual objects having a 3-dimensional appearance, image transition effects such as wipes, dissolves, and tumbles, and a variety of colors and fonts. This viewer interface also preferably supports active animation of displayed objects to entertain the viewer and to focus the viewer's attention upon a particular interface object for controlling a service or feature. The viewer interface also should be sufficiently flexible in appearance to allow a service provider to design and implement objects having unique appearances for different applications, thereby permitting a viewer to distinguish these applications.

From a technical perspective, the delivery of video signals for presentation by a conventional television screen is limited by the display screen variations in the numerous models of televisions and the limitations inherent in the National Television Systems Committee (NTSC) standards for formatting video signals. The NTSC has established title and video safety standards to define a space within the television screen for readable text and images. The area of the television screen that is considered to support the most reliable presentation of text or title information, which is known as the "safe title" area, is approximately the center 80% of the horizontal and vertical space of a television screen. Likewise, the area of the television screen that is considered to support the most reliable presentation of moving images, which is known as the "safe action" area, is approximately the center 90% of the horizontal and vertical space of a television screen.

Because these NTSC standards suggest that the video performance of even modern televisions suffers from horizontal and vertical drift problems, the viewer interface for an interactive television network should support the video safety standards to ensure that objects intended for display are actually fully presented to the viewer. However, it will be appreciated that this implementation also effectively reduces "usable screen space" or display resolution for the user interface. This is dramatically different from the computer environment where the entire screen of a computer monitor can predictably be used to present static and dynamic objects to a user.

The design of the viewer interface for an interactive television network also must consider the well known phenomenon of "flicker" arising from the scanning of vertical and horizontal scan lines in a television screen. It would be desirable for the items displayed on a viewer interface for the interactive television network to be drawn with lines having a pixel width of more than one pixel to reduce flicker and to support a more readable presentation of the displayed items.

Unlike traditional television which is a unidirectional broadcast transmission medium, interactive television is a bidirectional communication medium. Interactive television combines traditional television technology with traditional computer technology and introduces new material specific to the interactive television environment. Interactive television may superimpose upon a traditional television display a number of "control items" that present selectable options to the viewer. Selection and subsequent execution of a control item by a viewer may cause an "action command" to be transmitted from the viewer to the headend. For example, a viewer may order goods, select programming, or respond to an interactive program through execution of control items.

Viewers of interactive television systems may be of varying degrees of sophistication. In particular, some viewers may have little or no computer background and may be unfamiliar with traditional computer graphical user interfaces. Therefore, in order to be effective, a graphical viewer interface for an interactive television system must be capable of communicating useful information to a viewer who is otherwise unfamiliar with computer protocols or the interactive television system itself. Typically, a viewer may be sitting several feet or even several yards away from the television screen and will have only a remote control for communicating with the interactive television system. The remote control may have significantly less communication capability than a traditional keyboard and mouse system used on conventional computer systems. Therefore, a graphical viewer interface for an interactive television system must provide a relatively simple, easy to read display within the capabilities of NTSC display devices, and a highly effective means of communicating control information to the viewer. Basically, an average viewer with minimal computer skills should be able to view the interactive television screen and understand from the information presented thereon how to use the system.

Graphical user interface systems for conventional computer systems have been in wide spread use for several years. Conventional graphical user interface systems utilize a variety of visual devices to display selectable options and executable commands to the user. For example, button displays such as "open" and "close" are in wide use, as are icons for selecting and initiating application programs. A user typically navigates a cursor on a screen display using a keyboard or a mouse, and selects a control item by placing the cursor in the same area on the screen as the control item, and then entering a predefined command such as a keyboard stroke or click of a mouse button. In many conventional systems, a "single click" of the mouse button selects a control item or menu item. A selected button is often indicated by placing a highlighting ring around the perimeter of the selected item, or changing the display of the item itself. When selected, a control item is in a state responsive to commands from the user input device. For example, the function associated with a selected item will typically be executed if a subsequent command is entered, typically a "double click" of the mouse button.

A selected control item responsive to input is said to have the "focus." As noted, the display of a control item that has the focus is typically altered, for example by highlighting the display of the item or surrounding the selected control item by a border to indicate to the viewer that the selected control item has the focus. Thus, the viewer can tell by looking at the display which one control item among a plurality of control items displayed on the screen has the focus.

For example, on a traditional computer with several applications running simultaneously, each application may appear as a frame with the selected frame in the foreground and the unselected frames in the background. In this context, the frame in the foreground has the focus and is capable of receiving input from the keyboard or mouse. Using a typical mouse system as an example, a user may point to an exposed portion of a background frame and click the mouse button once causing the background frame to move into the foreground and become the application with the focus. In this context, the focus is indicated by placing the application with the focus in the foreground, placing all non focused objects in the background, and typically displaying the background applications in a muted format.

A somewhat different method of indicating the focus is typically used when the user is selecting among icons in a traditional computer environment. When a user places the cursor over a particular icon and single-clicks the mouse button, the view of the icon usually changes indicating that the particular icon has the focus. A user may then double click or depress the "enter" key in order to invoke the application associated with the icon. In this context, the focus is usually indicated by changing the view of the icon with the focus.

Thus, in one conventional computer embodiment, the user must take some action, such as single-clicking the mouse button, in addition to navigating the pointer or cursor in order to change the focus. In another conventional computer embodiment, the focus automatically follows the cursor without the user having to enter a command such as a single click. In this embodiment, the focus automatically follows the cursor, moving among control items in response to relocation of the cursor.

Graphical user interface systems for traditional computer systems have a number of shortcomings when considered in the context of an interactive television system graphical viewer interface. In a traditional computer environment, the entire screen is available for providing information to the user, whereas there is a limited portion of the screen that can be used in an interactive television environment. In addition, the user of a traditional computer usually sits very close to the screen, perhaps only a foot or two away, and therefore can read relatively small print on the computer screen. By contrast, viewers in an interactive television environment may sit much further away, perhaps several feet or yards. Moreover, users of traditional computer systems are typically computer literate and willing to resort to a user manual to gain more information on how to use the system. Interactive television viewers, on the other hand, may be much less sophisticated in the use of computer systems and far less likely to resort to the use of a manual to determine how to use the system.

Therefore, a viewer of an interactive television system may require more explicit indications of a prompt and more explicit indications of how to respond. Accordingly, the meaning of control items displayed on the screen in an interactive television environment must be patently clear to the viewer based on the appearance of the control items alone.

To accommodate the needs of an interactive television system, it would be advantageous if a graphical viewer interface for an interactive television system embodied an improved means for conveying basic control related information to the viewer. In particular, it would be advantageous in an interactive television environment to have a more visible and more easily understood method for indicating the focus.

There are a number of other shortcomings associated with traditional computer graphical user interface techniques for controlling and displaying the focus in the context of an interactive television environment. First, a keyboard or mouse is typically required to navigate the cursor and perform the single-click and double-click functions necessary to change the focus and invoke items with the focus in traditional computer graphical user interface systems. In an interactive television environment, the viewer will typically not have a mouse or keyboard but will only have a remote control unit which typically will support only a limited set of commands, such as a directional navigation thumbpad and an action key. Therefore, the single-click method of indicating a viewer's desire to change the focus will typically not be available in an interactive television environment.

Second, the methods of indicating which control item has the focus in a traditional computer environment may be insufficiently communicative in an interactive television environment. Simply bringing items from the background to the foreground, or using a focus ring or illumination, may not be sufficient to impart focus related information to the viewer of an interactive television system where the background may appear very busy, which may be the case when a movie, television program, or video game is playing.

Third, programmers of applications running on traditional computer systems do not have a particularly strong motivation to attract a user's attention to a particular control item. In comparison, focus items in an interactive television environment may be called on to serve a promotional or advertisement related function. Similarly, application programmers of interactive television programs may want to customize the viewer interface in accordance with the theme of the underlying program. For example, a music program may use an animated musical instrument as a focus item, and a sports program may use an animated athlete as a focus item. Therefore, the method of indicating the focus in an interactive television environment will be improved over traditional computer graphical user interface focus methods if the focus items can be easily animated in accordance with the theme of the underlying program with a promotional motivation. In particular, it would be advantageous if sponsors or authors of individual application programs could customize the focus item that is displayed during a particular application or portion thereof.

In summary, for an interactive television environment, there is a need for a viewer interface having simplified viewer interface controls that are optimized for the television environment in both appearance and behavior. The viewer interface should be entertaining and have the look of a television program. The controls of the viewer interface are preferably operable with a handheld control device, such as a remote control. The viewer interface should support NTSC video safety standards to ensure that items intended for display are actually presented to the viewer in a manner that is easily readable on a variety of conventional television sets.

Moreover, there is a need in a graphical viewer interface for an interactive television environment for a more flexible, more communicative means of indicating which among a plurality of control items displayed on a screen has the focus, a need for a focus control mechanism that does not rely on a mouse or keyboard, and a need for a focus item that is easily programmable and amenable to serving customized promotional and advertising functions. In addition, there is a need for a focus item that is easily viewed and understood from the range of distances at which users will view interactive television systems.

SUMMARY OF THE INVENTION

The present invention addresses these issues by providing a viewer interface designed for use in the environment of an interactive television network and by providing an animated focus item. As used herein, an "animation" means any form of highlight that is non-static, including but not limited to flashing, varying illumination, varying size, varying shape, varying display components, a moving cartoon type image, a video image, a sound track, or a combination of more than one of these elements. For example, an animated focus item may be a moving cartoon figure, a flashing ring, a sequence of illumination levels, a video image, an audio enunciation, or any combination of these elements. Control over the focus is accomplished by viewer interaction with the remote control unit and does not require a keyboard or mouse to indicate the viewer's desire to change the focus from one control item to another.

The preferred embodiment of the present invention is directed to a graphical viewer interface for an interactive television system that can deliver a variety of services, including entertainment, information, and transaction services, to consumers via an interactive broadband network. This viewer interface is typically presented via a conventional television including a display screen and audio speaker. The viewer interface may superimpose over a conventional television video display one or more control items representing control objects having various control functions associated with the operation of the interactive system. For example, the viewer interface may display on the display screen visual representations of buttons, "spin dials" (i.e. scrollable lists), or grids containing selectable items. The control items may be custom designed by an application programmer and may vary in size, shape, and location on the display screen during the course of an interactive session.

A focus item is a visual or audio indicator used to indicate to the viewer which control item, among a plurality of control items displayed on the screen, is currently "selected" and responsive to user commands. The viewer may navigate the focus amongst the various control items by manipulating a handheld remote control. For example, if three buttons are displayed on the screen for ordering items on a pizza— "mushrooms", "peppers", and "pepperoni"—the viewer may order "pepperoni" by navigating the focus to the button representing "pepperoni" and then depressing an action command button on the remote control.

The present invention provides a system for highlighting the currently selected control item by associating an animated focus item with the selected control item. The animation may be in many different forms. For example, animation may be in the form of altering the view of the control item or associating a separate focus item with the selected control item. A separate focus item may be in many different forms, such as a ring around the control item or a cartoon type display. Such a cartoon display may additionally comprise several frames displayed in succession to depict movement. The cartoon display may also include video and audio components, possibly synchronized to other aspects of the animated focus item. A focus item may be custom designed by an application programmer. For example, during a football game the focus item may be a cartoon football player that appears to run up to and jump on a control item. During a music program, the focus item may be a musical instrument that appears to play a sound that is played over the audio speaker. During a detective program, the focus item may be a flashlight that appears to illuminate the perimeter or interior of a control item.

According to the present invention, a focus item's size, position, and appearance may be automatically adjusted in response to the control item with which it is associated. For example, if the focus item is a flashlight that is used to illuminate the perimeter of a control object, the display of the illumination may automatically adjust to the size and shape of different control items as the viewer navigates the focus amongst a plurality of control items with varying sizes and shapes. The focus item may also appear to interact with control items of varying size. For example, a focus item may be displayed as a rain cloud that appears to rain on and fill a control item with water. A transitory focus item may appear to travel from one control item to another to indicate a change in focus. For example, a focus item may appear as a car that speeds from one control item to another in response to changes in the control item having the focus. The appearance of the focus item in these contexts may be automatically adjusted in response to the size, position, and appearance of the control item(s) with which it is associated.

Generally described, the present invention is a method and system for a graphical viewer interface for use in a computer system including a memory, a display screen, and a user input device. The inventive system includes a method for communicating to a user that a control item displayed on the display screen is in a state responsive to signals from the user input device. The system displays the control item on the display screen, determines that the control item is to be responsive to signals from the user input device, retrieves from memory configuration defining information relating to attributes of the control item, generates a focus item having a configuration based on the configuration defining information relating to the control item, and displays the focus item on the display screen in association with the control item.

More specifically, the present invention allows an animated focus item to be presented to the viewer, such as a focus item including a non-static display on the display screen. Similarly, the inventive system allows a sound to be emitted in association with the display of the focus item on the display screen. The focus item may include an image within the area defined by the boundaries of the control item, may include an image in an area of the display screen adjacent to the area in which the control item is displayed, or may include a combination thereof.

According to another aspect of the present invention, two or more control items may be displayed on the display screen with a first focus item displayed in association with a first control item. In response to a user command, the first focus item is discontinued, a second control item that should receive the focus is determined, configuration defining information relating to attributes of the second control item is retrieved from memory, and a second focus item that has a configuration based on the configuration defining information relating to the second control item is displayed in association with the second control item. The configuration defining information may pertain to the size and shape of the control item on the display screen and may also pertain to the location of the control item on the display screen. The configuration defining information may also include information identifying an animation to be displayed in association with the control item or the focus item.

According to another aspect of the present invention, a path on the display screen may be determined from a first control item having the focus to the second control item that is to receive the focus. A transitory focus item is generated and displayed on the display screen as moving along the path from the first control item to the second control item. Configuration defining information associated with the first or second control item may include information indicating that a transitory focus item should be displayed and may also include information identifying an animation to be displayed in association with the transitory focus item. Similarly, the configuration defining information may include information indicating that a sound is to be emitted in association with the display of the transitory focus item on the display screen.

According to another aspect of the present invention, a cursor is displayed on the display screen. The position of the cursor is manipulated on the display screen in response to a signal from the user input device caused by the action of the user, and the position of the control items on the display screen and the position of the cursor on the display screen are compared. If the cursor is in a focus zone associated with a control item and if the control item is enabled for receiving the focus, configuration defining information relating to attributes of the control item is retrieved from memory and used to configure a focus item displayed in association with the control item.

According to another aspect of the present invention, the step of retrieving the configuration defining information includes calling an interface supported by a control object associated with the control item and calling specifying parameters utilized by the control object to cause the control object to provide the configuration defining information.

Accordingly, it is an object of the present invention to provide a graphical viewer interface having simplified viewer interface controls that are optimized for the interactive television environment in both appearance and behavior.

It is another objective of the present invention to provide a graphical viewer interface having the look of a television program.

It is another objective of the present invention to provide a graphical viewer interface having controls that are operable with a handheld control device, such as a remote control.

It is another objective of the present invention to provide a graphical viewer interface that supports NTSC video safety standards to ensure that items intended for display are actually presented to the viewer in a manner that is easily readable on a variety of conventional television sets.

It is another objective of the present invention to provide a graphical viewer interface for the interactive television environment that presents a plurality of control items and a focus item to a viewer wherein the focus item indicates which among a plurality of control items displayed on a screen has the focus.

It is another objective of the present invention to provide a graphical viewer interface for the interactive television environment including an animated focus item.

It is another objective of the present invention to provide a graphical viewer interface for the interactive television environment that is flexible and easily programmed to define the appearance of control and focus items displayed to the viewer.

It is another objective of the present invention to provide a graphical viewer interface for the interactive television environment that is easily programmable and amenable to serving customized promotional and advertising functions.

It is another objective of the present invention to provide a graphical viewer interface for the interactive television environment including a focus item that is easily viewed and understood from the range of distances at which users will view interactive television systems.

These and other objects, features, and advantages of the present invention may be more clearly understood and appreciated from a review of the following detailed description and the appended drawings and claims.

BRIEF DESCRIPTION OF THE DRAWING FIGURES

Figure 1:
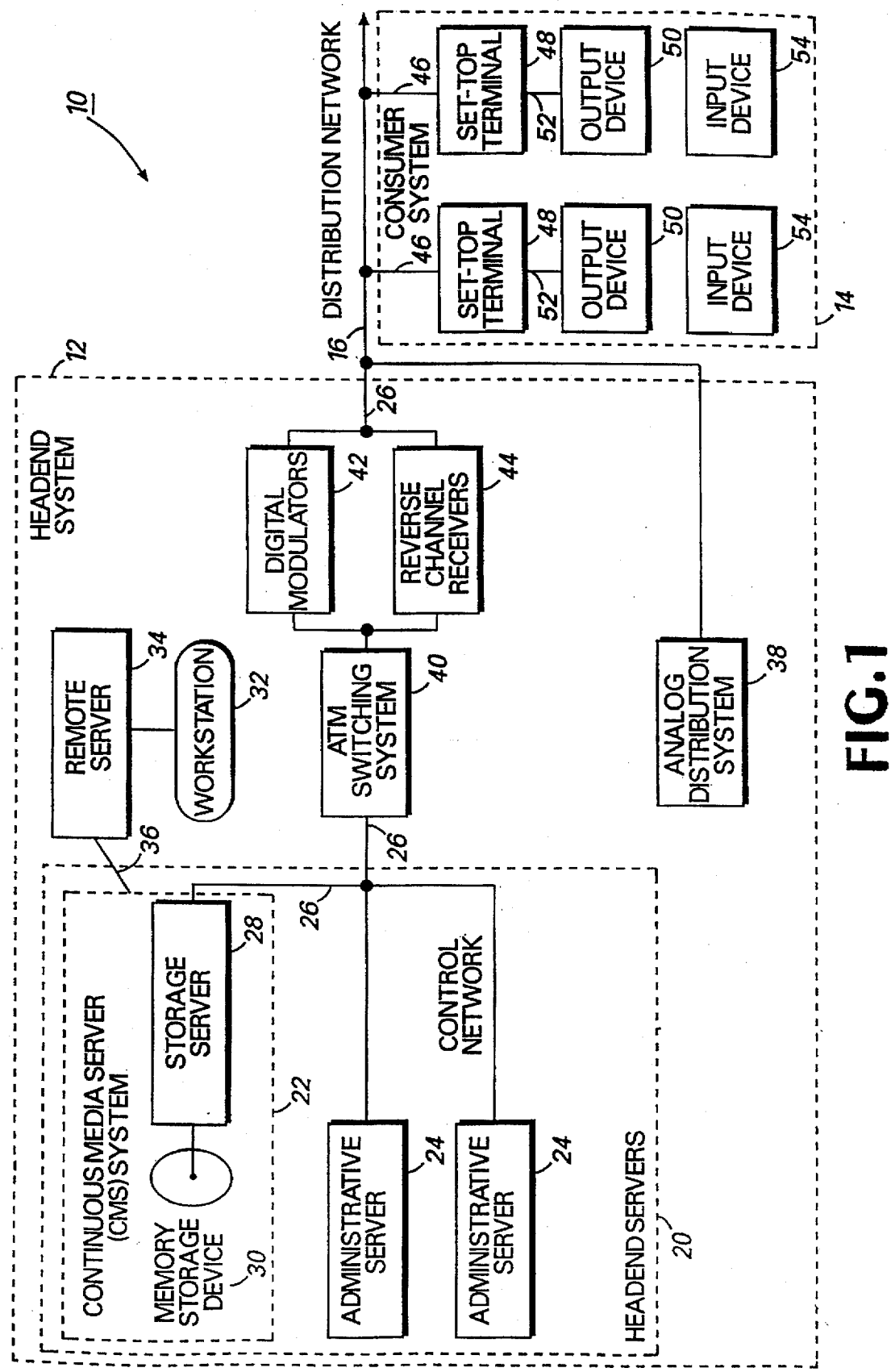
FIG. 1 is a block schematic diagram of an interactive television system for which the present invention is suitable.
Figure 3A:
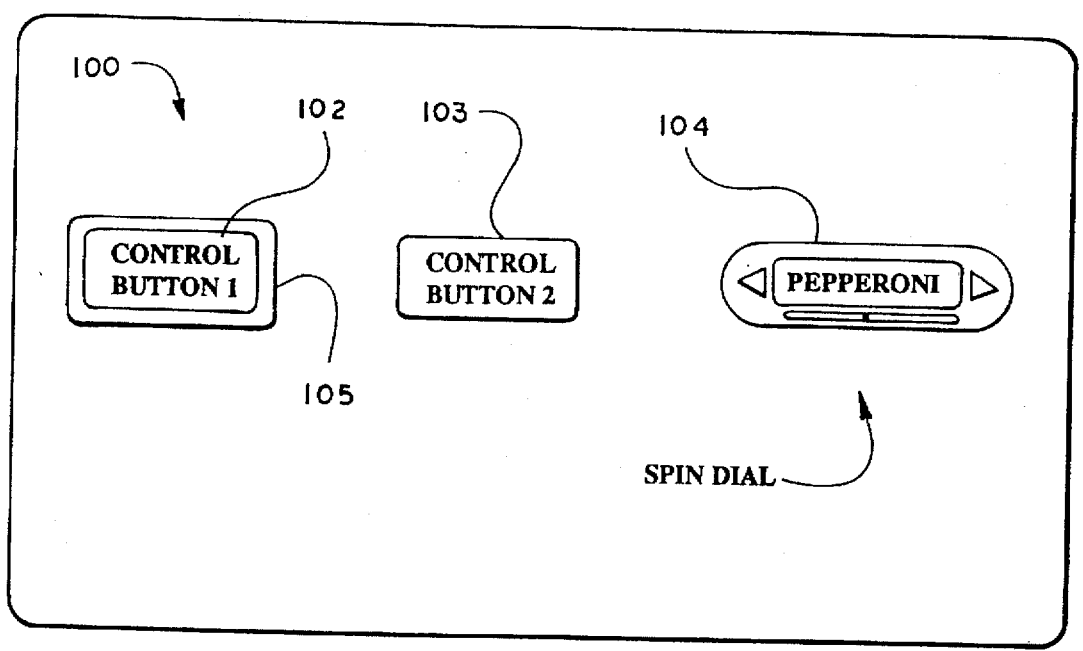
Figure 3B:
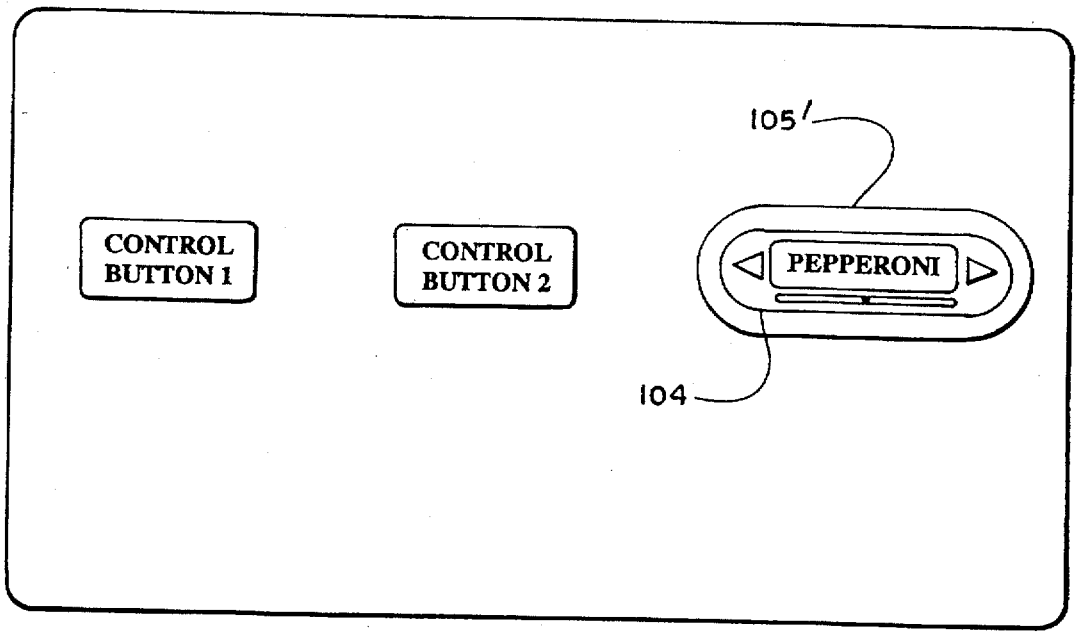

FIG. 3, consisting of FIGS. 3A-3B, includes illustrative screen displays of a graphical viewer interface including control items and a focus item used in the interactive television system shown in FIG. 1.

FIG. 4 is a schematic drawing of a user input device used in connection with the interactive television system of FIG. 1, namely, a remote control unit.

Figure 5A:
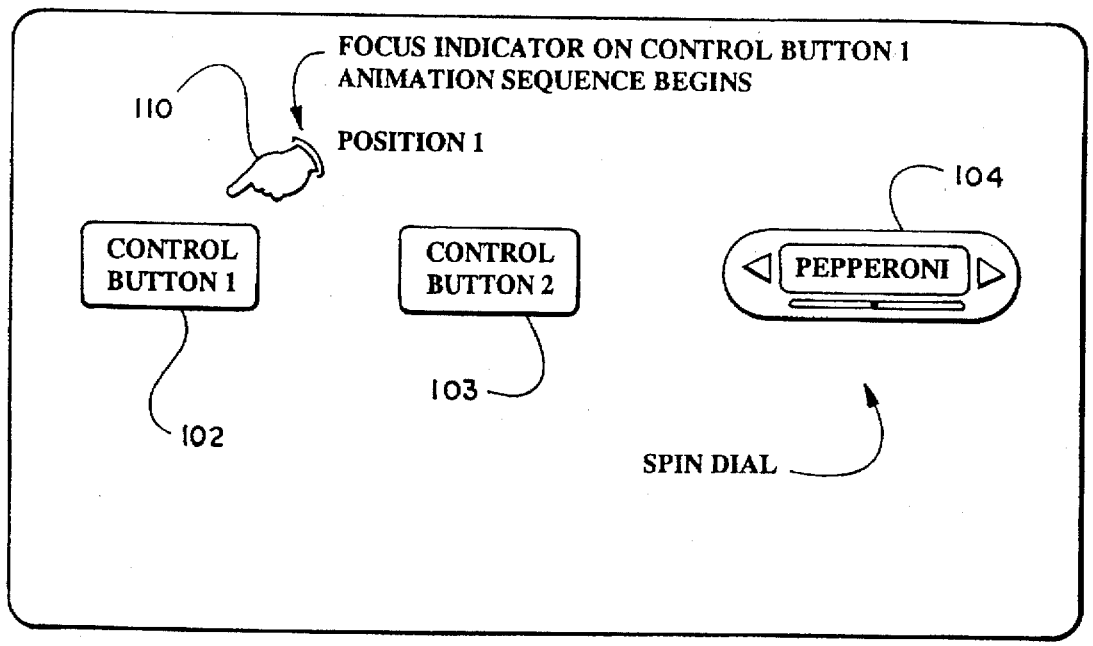
Figure 5B:

FIG. 5, consisting of FIGS. 5A-5D, is a schematic drawing which illustrates an animated focus item as seen during interaction with the interactive television system of FIG. 1.

FIG. 6, consisting of FIGS. 6A-6H, is a schematic drawing which illustrates a transitory focus item as seen during interaction with the interactive television system of FIG. 1.

Figure 7:
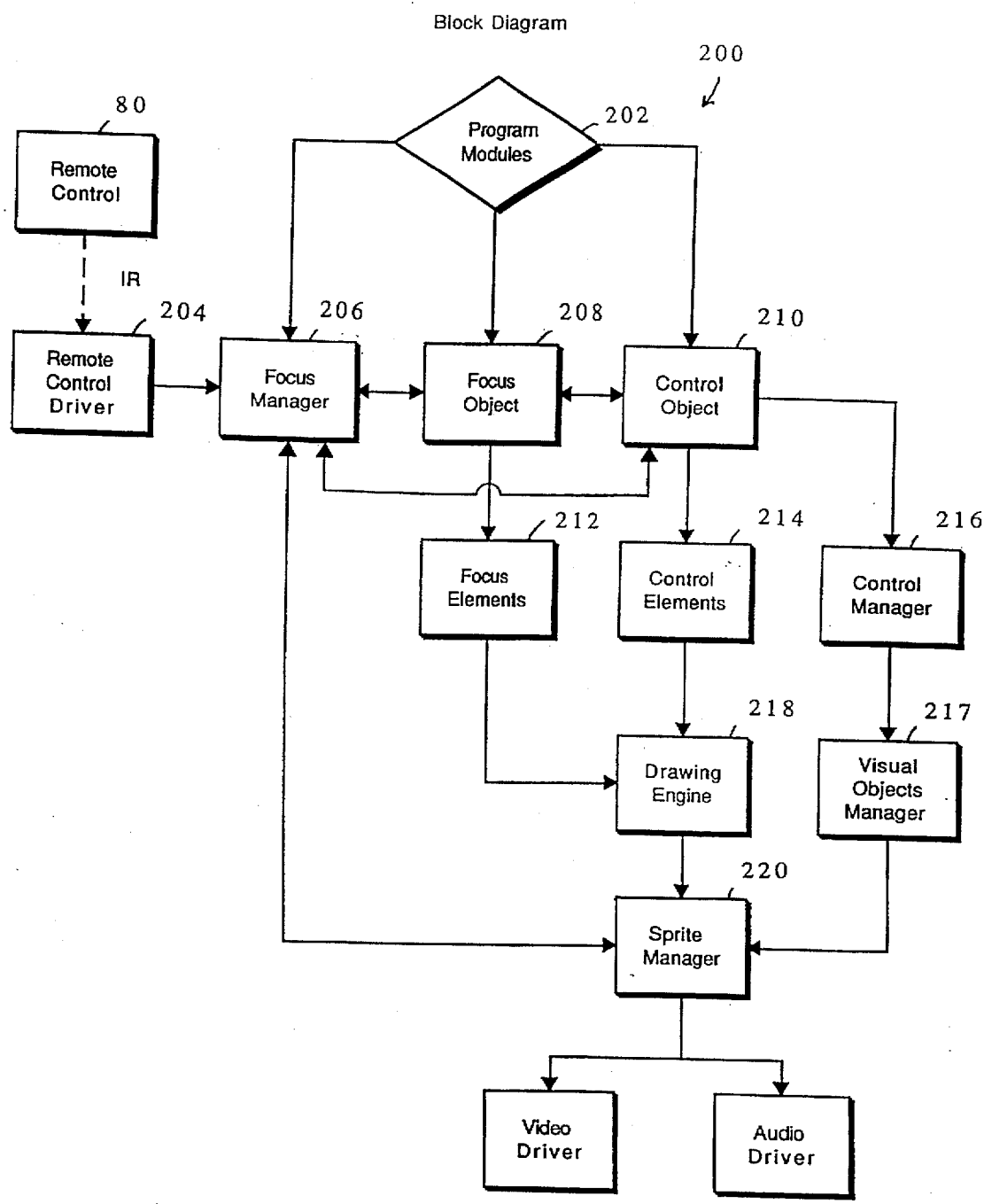

FIG. 7 is a block diagram of the components of the interactive television system that control the appearance and behavior of control and focus items.

FIG. 8, consisting of FIGS. 8A-8D, is a schematic drawing which illustrates exemplary control items utilized in the interactive television system shown in FIG. 1.

Figure 9A:
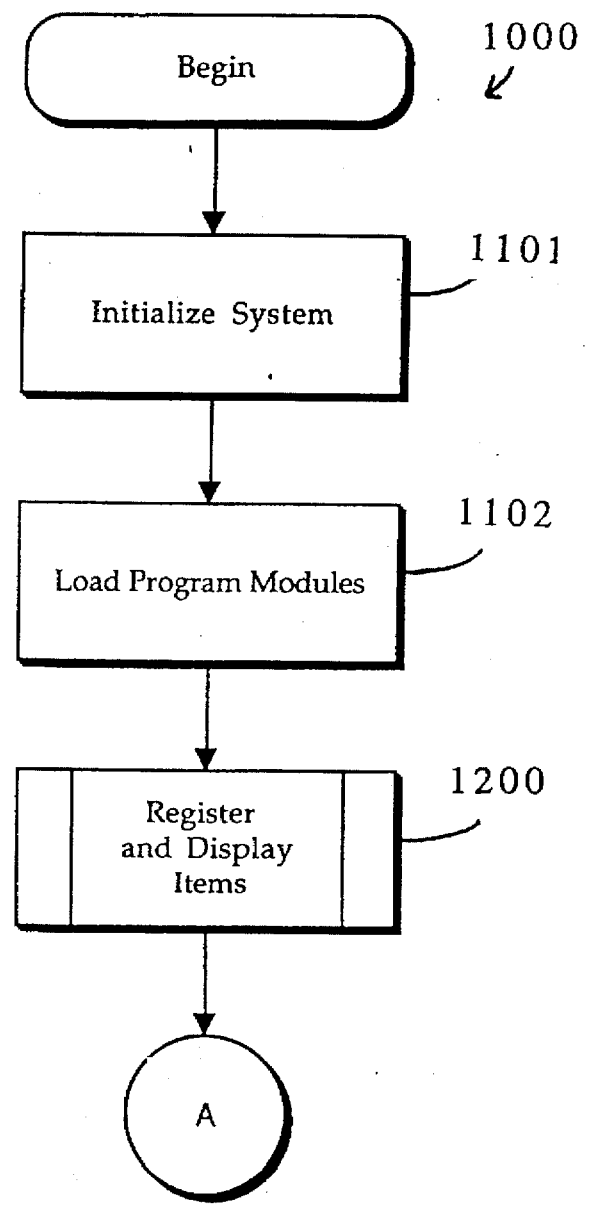
Figure 9B:
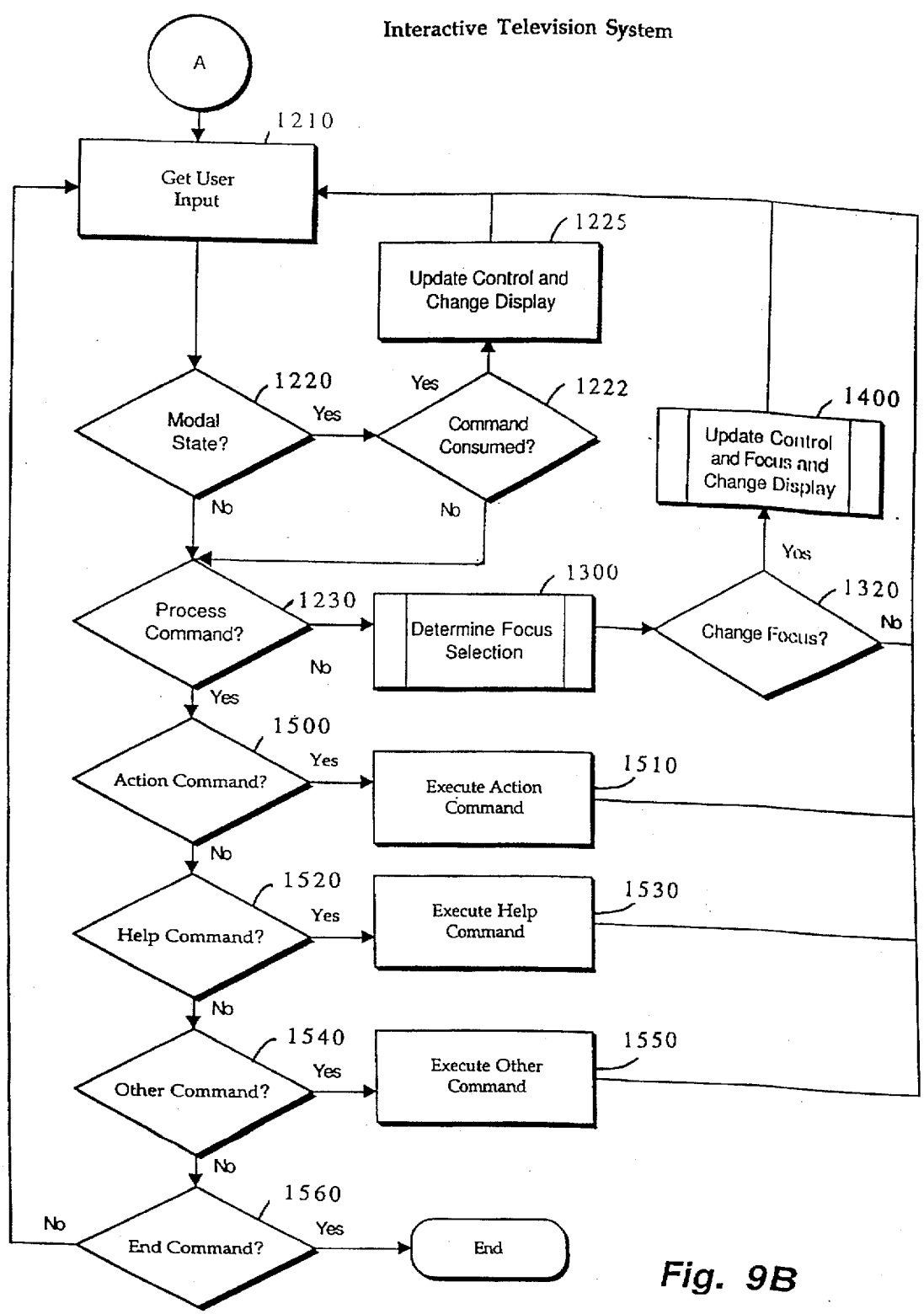

FIG. 9, consisting of FIGS. 9A and 9B, is a flow diagram illustrating the overall functional operation of the focus in a graphical viewer interface for the interactive television system shown in FIG. 1.

Figure 10:
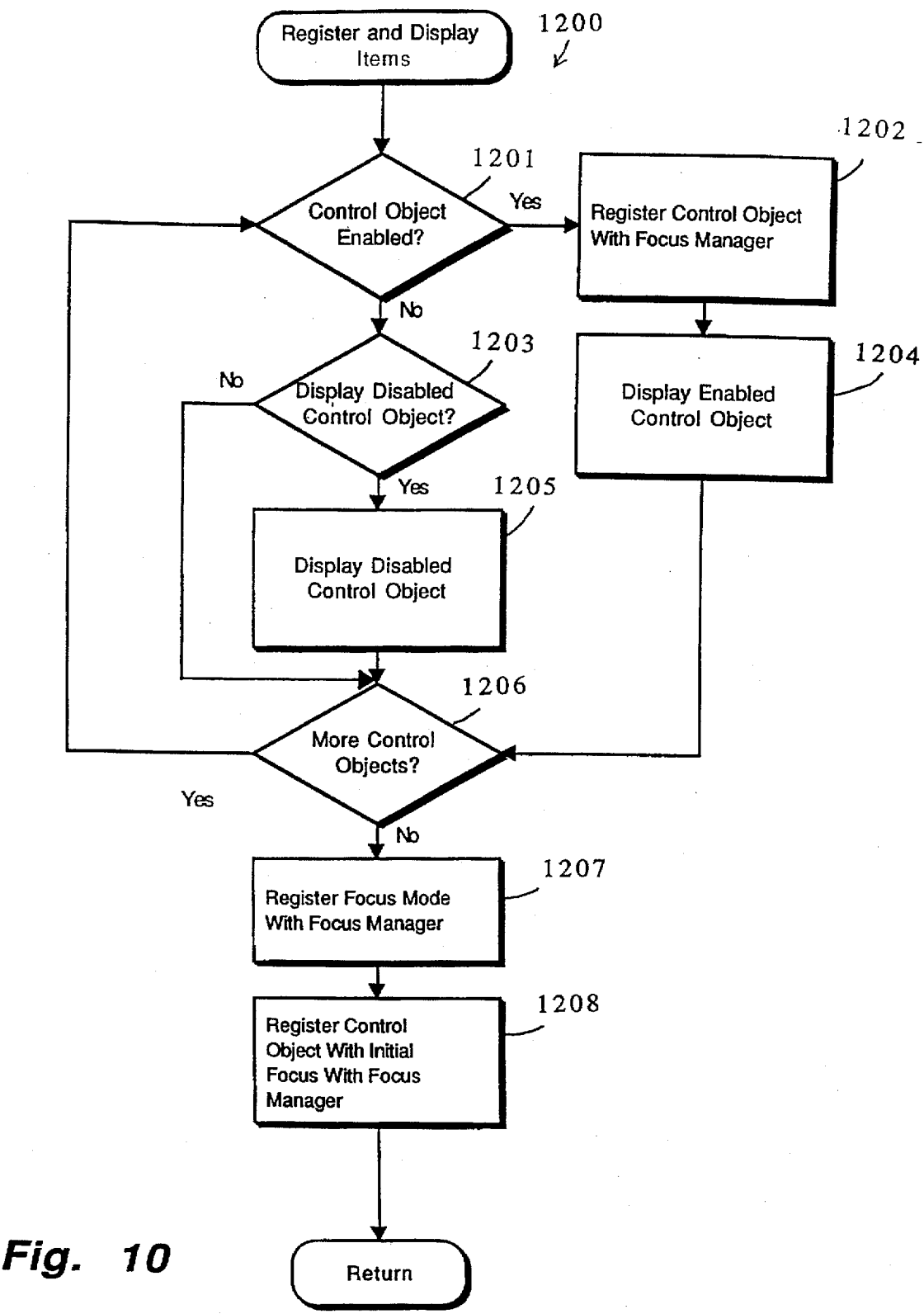

FIG. 10 is a flow diagram illustrating a routine for registering and displaying items on a display screen.

Figure 11:
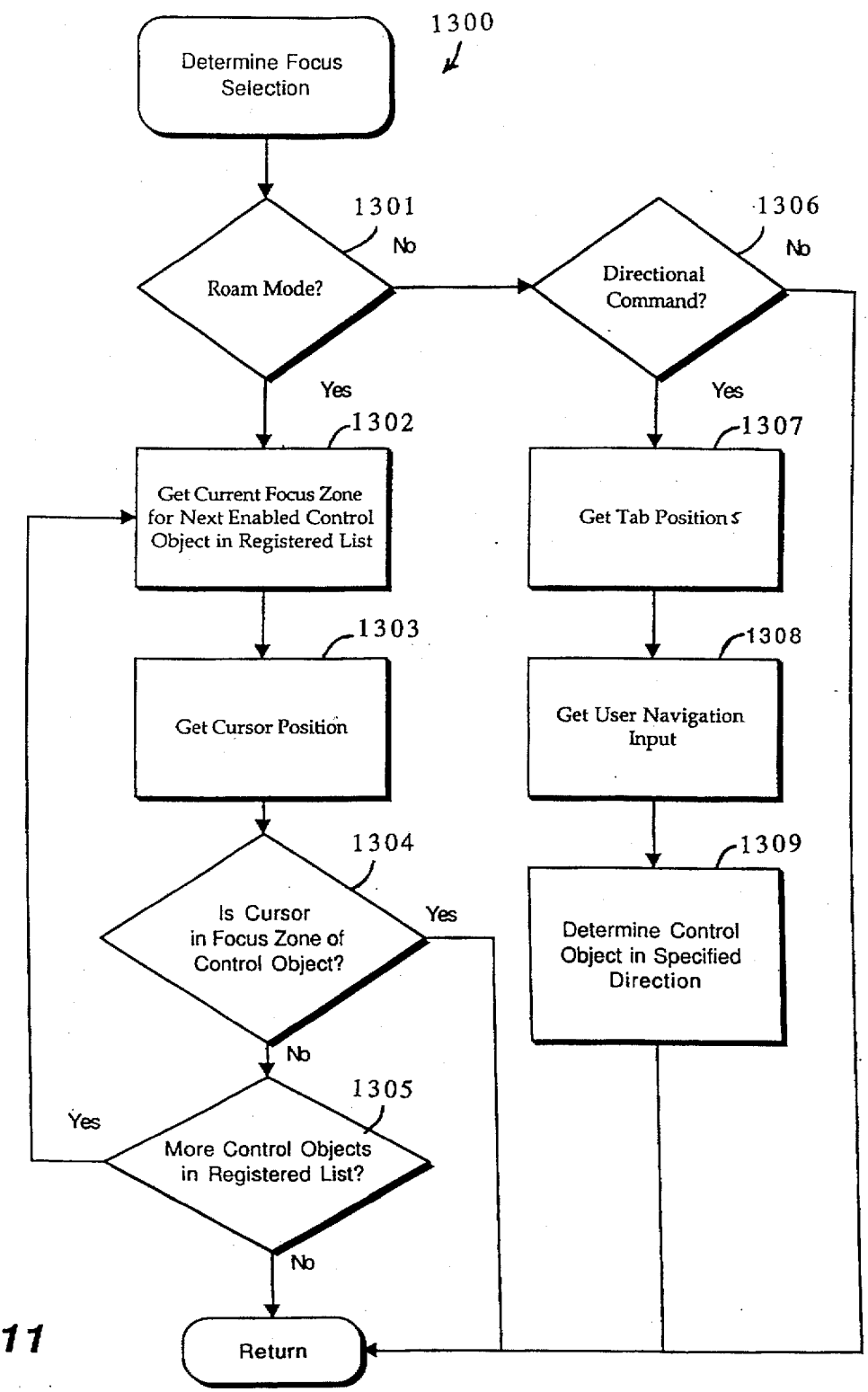

FIG. 11 is a flow diagram illustrating a routine for determining focus selection of a control item.

Figures 12, 12A, 12B:
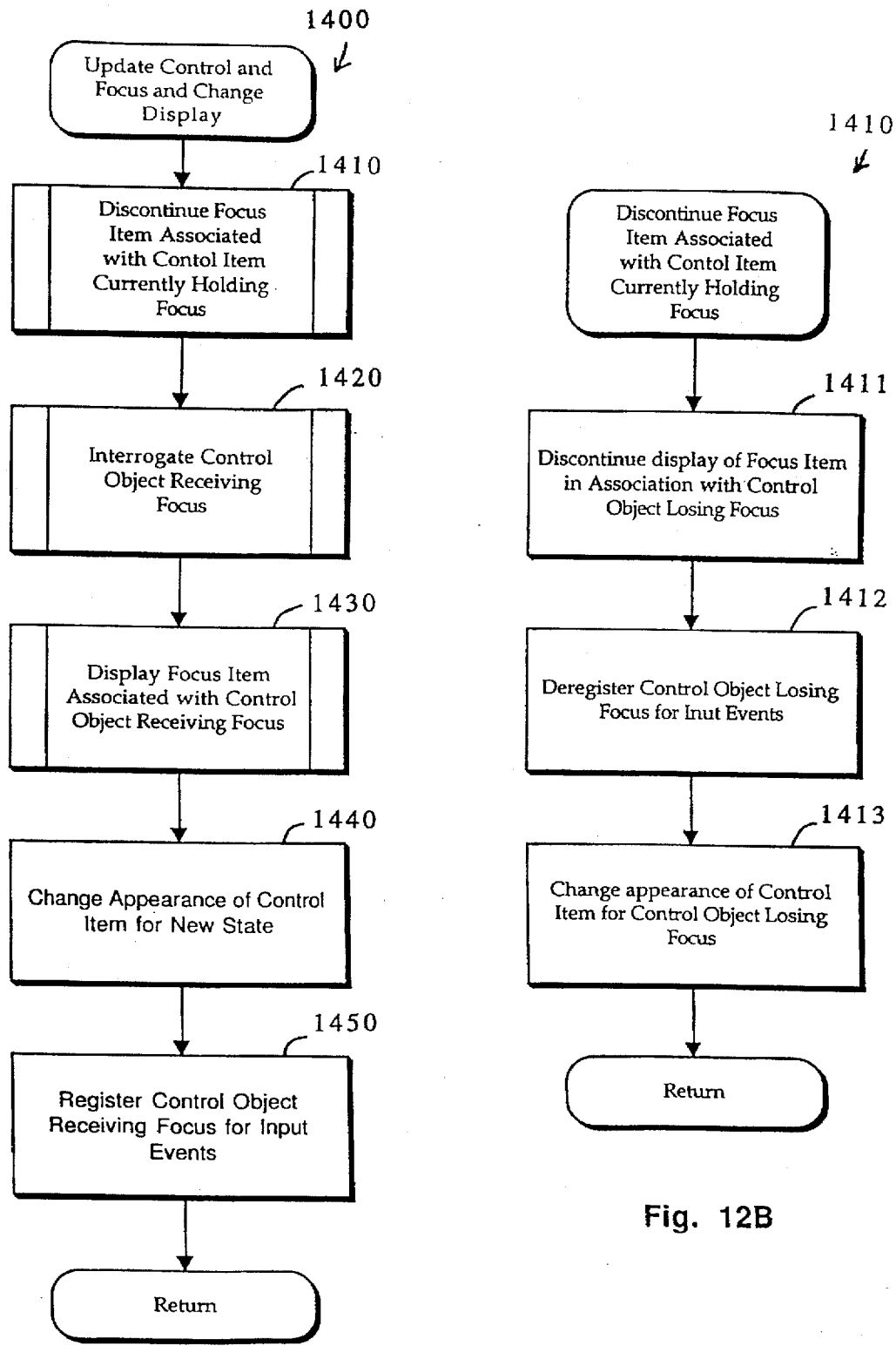

FIG. 12, consisting of FIGS. 12A and 12B, is a flow diagram illustrating a routine for updating the screen display.

Figure 13:
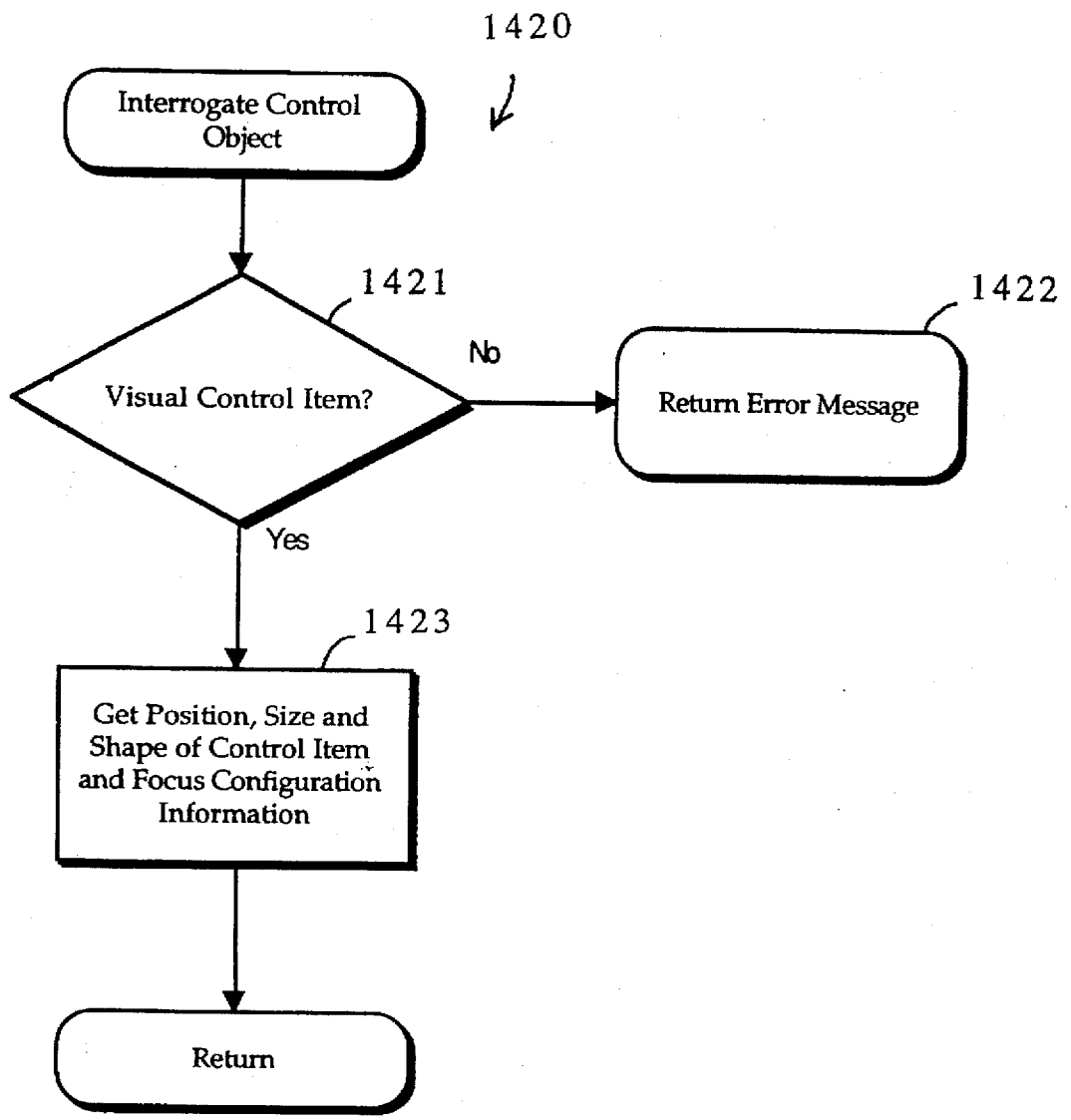

FIG. 13 is a flow diagram illustrating a routine for interrogating a control object.

FIG. 14 is a flow diagram illustrating a routine for displaying a focus item associated with a control object.

Figure 15:
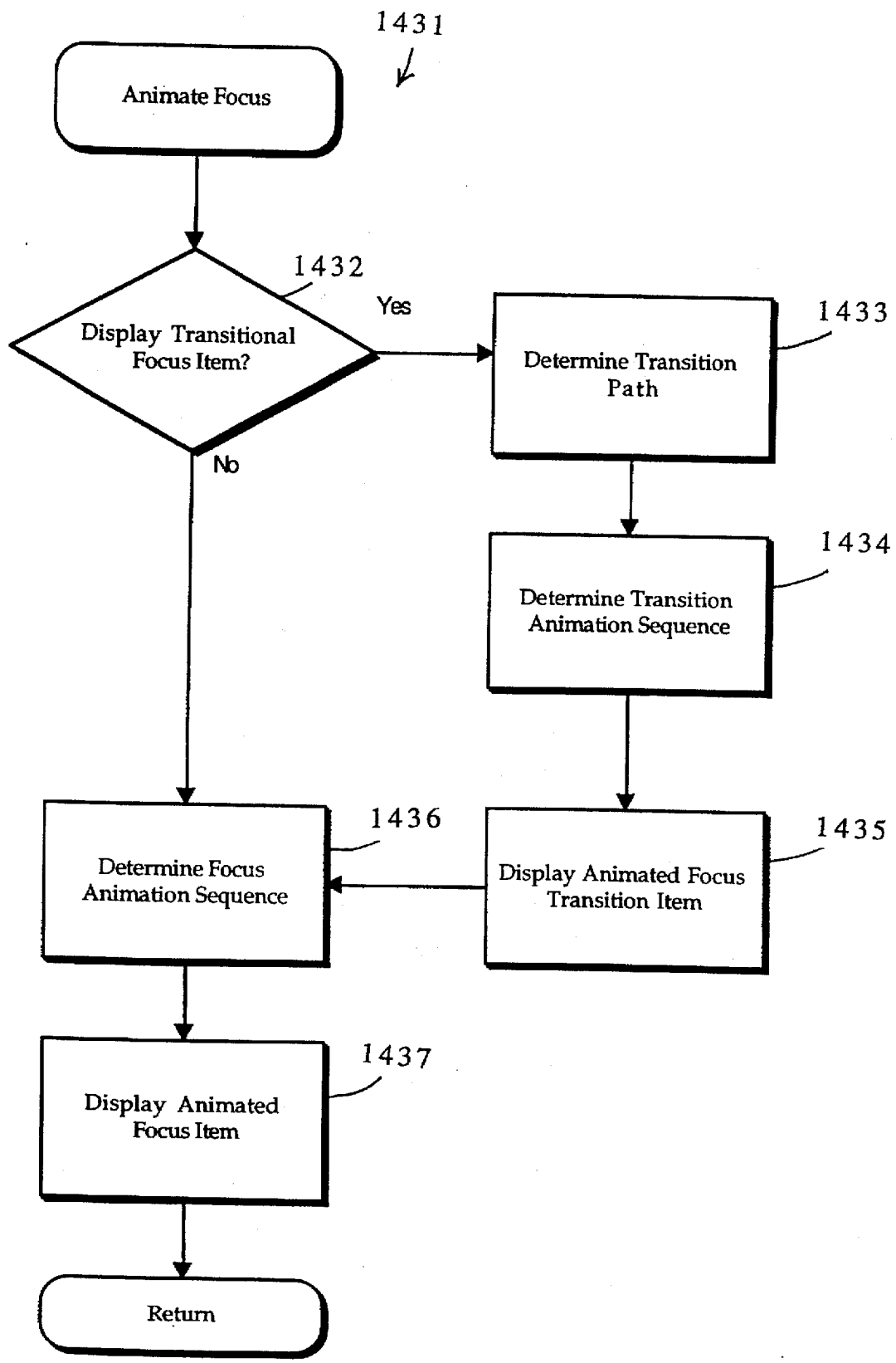

FIG. 15 is a flow diagram illustrating a routine for animating a focus item.

DETAILED DESCRIPTION OF THE PREFERRED EMBODIMENTS

Prior to discussing the preferred embodiments of the present invention, a few definitions of terms utilized herein are provided for convenience of the reader:

Definitions

As used herein, an "animation" means any form of highlight that is non-static, including but not limited to flashing, varying illumination, varying size, varying shape, varying display components, a moving cartoon type image, a video image, or a sound track, or a combination of these elements. Pursuant to the preferred embodiment of the present invention, program developers will have flexibility to incorporate a wide range of custom designed animations into focus items. Therefore, the meaning of animation as used herein is intended to be given a broad meaning that includes means of animation that may not be expressly described herein.

As used herein, an "object" refers to a software element comprising an associated set of function members and data members accessible through a set of predefined interface commands. An object may comprise function members and data members that cause a visual or audio display to manifest on an output device. For example, an object may include bit maps and instructions that cause an animated cartoon figure to move across a television screen together with a synchronized sound track playing over a speaker.

As used herein, a "control object" is an object capable of being selected and receiving and responding to viewer commands. Typically, the selection and execution of a control item by a viewer causes a command to be generated and transmitted to another object or device. For example, in a video on demand context, a control object executed by a viewer may cause a command to be transmitted from the set-top to the headend causing the selected movie to be transmitted to the set-top terminal from the headend. In other contexts, such as in a video game context, control objects may generate and transmit commands that are acted upon entirely within the set-top terminal and equipment connected on the viewer end of the set-top terminal.

As used herein, a "control item" is an aspect of a control object that is perceptible to a user, such as a screen display or a sound track. Thus, when a viewer "executes a control item" displayed on the screen, for example by pointing to the control item and pressing an action key, function members of the associated control object may be activated which cause the appropriate response to occur.

As used herein, a "control element" is an object that is used, singularly or in combination, to embody or instantiate control items. A control element is typically a building block, such as a frame, picture, or text element, from which a more complicated control item may be constructed.

As used herein, the term "focus" means in a state responsive to commands from a user input device. A control object has the focus when it has been selected.

As used herein, a "focus object" is an object, separate from a control object, that causes a display to be presented to the viewer to indicate that a particular control object is selected. For example, a focus object may alter the view of the selected control object or associate a separate focus item with the selected control object.

As used herein, a "focus item" is an aspect of a focus object that is perceptible to a user, such as a screen display or a sound track. For example, in a video on demand context, three control objects embodied as visual button control items displayed on the display screen may be displayed to a viewer wherein each button represents a movie that the viewer may select for viewing. A focus item may also be displayed to highlight a particular one of the buttons to indicate to the viewer that the particular movie associated with the highlighted button will be chosen if the viewer communicates an action command. A viewer may navigate the focus object, as indicated by the focus item, between the various control objects by manipulating the controls on the remote control unit. A focus item may be present as an aspect of a control item or as a separate item.

As used herein, a "focus element" is an object that is used, singularly or in combination, to embody or instantiate focus items. A focus element is typically a building block, such as a frame, picture, or sound element, from which a more complicated focus item may be constructed.

As used herein, a "sprite" is a small (relative to the total display area), generally rectangular prestored bit map or image that is mixed with the rest of a displayed image at the video level. Sprites are generally hardware-based, involving circuitry or software methods operative to efficiently retrieve the sprite image from a predetermined memory location and mix it with other video forming the displayed image. The location of the sprite at any time relative to the displayed image is specified in data storage registers. Altering the values in the registers via software methods causes the sprite to move. The sprites may hide portions of the displayed image at each pixel (e.g. by providing appropriate opaque alpha values for the pixels in the sprite) or may be partially blended with the pixel values of the displayed image. Sprites are often used to implement cursors and generate animations by moving a sprite around, either on top of a background image, or on top of or under other displayed images or sprites. Sprites are also often used to generate animations by displaying a succession of related sprites depicting movement.

Given the above definitions, it will be appreciated that a focus item may be composed of one or more sprites. A focus item may also be the result of a parent focus object containing one or more of a standard set of focus elements. A focus element is an object in its own right that may contain data members possibly comprising one or more sprites and function members that may cause images and/or sprites to be presented to a viewer. It will therefore also be appreciated that to cause a focus item to be displayed, a focus object may call one or more focus elements which in turn activate one or more sprites or perform other drawing activities, which cause the display of the focus item to appear on the screen. In this manner, a visual focus item can generally be thought of as being constructed by a number of focus elements, which are contained by a focus object. Similarly, a visual control item can generally be thought of as being constructed by a number of control elements, which are contained by a control object.

Introduction

The preferred embodiment of the present invention is directed to a graphical viewer interface for an interactive television system that can deliver a variety of services, including entertainment, information, and transaction services, to consumers via an interactive broadband network. This viewer interface, which is typically presented via an output device, such as a television or monitor screen, can include one or more control items representing control objects having various control functions associated with the operation of the interactive system. For example, the viewer interface can include control items representing available program options.

The present invention provides a system for "highlighting" the currently selected control item by associating an animated "focus item" with the selected control item. The animation may be in many different forms. For example, animation may be in the form of altering the view of the control item or associating a separate focus item with the selected control item. A separate focus item may be in many different forms, such as a ring around the control item or a cartoon type display comprising several frames displayed in succession to depict movement, and may also include video and audio components, possibly synchronized to other aspects of the animated focus item.

The present invention is preferably embodied in an object-oriented graphical viewer interface for an interactive television system targeted at the home consumer environment. The use of an object-oriented viewer interface enables rich interactive capability and high quality graphics production.

In one aspect of the preferred embodiment, control and focus objects are transmitted from the headend to the set-top box where they interface with other objects and the physical components at the viewer end of the interactive television system. In this manner, the application program determines which control items will be displayed on a viewer's television screen and how those control items will appear and behave. Similarly, a focus object may be transmitted from the headend to the set-top box where it causes a focus item to be presented to the user. Thus, application programs implemented at the headend provide a programmable vehicle for customizing the display of control and focus items at the viewer end of the interactive television system.

Although the preferred embodiment will be generally described as an interactive television system for delivering desired television programs and related information, those skilled in the art will recognize that the present invention also can be used to support the delivery of other forms of programming information, including radio, broadcast print, audio, games, computer software, including program modules such as application programs and operating systems, and other combinations of audio, video, and/or computer software. Accordingly, it will be understood that programming information generally includes information transmitted electronically to entertain, instruct, educate, or inform the recipient as well as program modules for supporting these services.

Likewise, those skilled in the art will also appreciate that the present invention can be extended to communicating control information within the general purpose computing environment. Specifically, the present invention supports user interfaces for displaying control information with general purpose computer systems, including desktop computers, portable computers, and handheld computers, including personal digital administrators.

Turning first to the nomenclature of the specification, the detailed description which follows is presented largely in terms of processes and symbolic representations of operations by conventional computer components, including a central processing unit (CPU) associated with a general purpose computer system, memory storage devices for the CPU, and connected pixel-oriented display devices. These operations include the manipulation of data bits by the CPU and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, numbers, records, files, or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc. which are often associated with manual operations performed by a human operator. The operations described herein are machine operations performed in conjunction with a human operator or user that interacts with the computer. The machines used for performing the operation of the present invention, as will be understood, include general purpose digital computers or other similar computing devices.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

Interactive Television Operating Environment

Turning now to the drawings, in which like numerals indicate like elements throughout the several FIGS., FIG. 1 illustrates the operating environment for an interactive television network, a preferred embodiment of the present invention. Referring to FIG. 1, the interactive television network 10 includes a headend system 12 for delivering programming information to and receiving instructions from a consumer system 14 via a "two-way" distribution network 16. The headend system 12 is the control center for collecting, organizing, and distributing the signals for all interactive network operations and the source for all programming information. The distribution network 16 transports signals carrying programming information and instructions between the headend system 12 and the consumer system 14. The distribution network 16 may include a world-wide public asynchronous transfer mode (ATM) compatible network with links to the Internet, third party service providers, and other wired and wireless communications networks. The consumer system 14 includes the equipment required for a consumer to receive programming information directly at his or her office or residence and to transmit requests and instructions to the headend system 12.

The headend system 12 can include a set of headend servers 20, including a continuous media server (CMS) system 22, and one or more administrative servers 24 to support various network functions, and a control network 26 linking these headend servers. The headend servers 20 can execute program modules, including service and application program software, to support the transmission of programming information and the reception of requests for such programming information.

It will be appreciated that the headend servers 20 are not necessarily located in one physical location but can be linked by wired and/or wireless communications paths supplied by the control network. The control network 26 can be a local area network, a wide area network, or a combination of both types of networks. For the preferred embodiment, the control network 26 is implemented as an ATM-based network for routing digital data between the headend servers 20 and the distribution network 16.

The CMS system 22 is a server-based file storage and delivery system that can manage on-demand access to stored digitized data. On-demand access of digitized data is a particularly desirable characteristic of the CMS system 22 if the interactive network supports the delivery of Video on Demand (VOD) or Movies on Demand (MOD) services. The preferred CMS system 22 can supply digital data streams at a constant rate to numerous consumers of the consumer system 14.

The CMS system 22 includes one or more storage servers 28, which operate to retrieve and to transmit the digitized data as required by clients of the CMS system, i.e., the equipment of the consumer system 14. The digitized data, which typically comprises programming information, is maintained on one or more memory storage devices 30 connected to the storage servers 28. Each memory storage device 30 can be implemented as a SCSI hard disk drive, an optical storage system, or any other similar mass storage media. By spreading the data management operations across a group of storage servers and memory storage devices, user load can be balanced with the limited disk, network, and input/output (I/O) resources of the headend system. This also supports fault tolerance by replicating digitized data within the CMS system 22 to survive the failure of a storage server or a memory storage device.

To support the tasks of updating or revising programming information stored on a memory storage device 30 of the CMS system 22, a computer workstation 32 and a remote server 34 can be connected to the control network 26 via a communications link 36. This communications link allows a program distributor or supplier, which typically operates at a location remote from the CMS system 22, to transmit programming information for storage by one or more of the memory storage devices 30 and for eventual distribution to consumers via the headend system 12. The communications link 36 can be implemented by either a wireless or wired communications system. For example, the communications link 36 can be constructed as a microwave link, a leased line link, a fiber optic link, a wire link, or as a conventional telephone link.

The administrative servers 24 of the headend system 12 can support a variety of services and applications associated with the interactive television network 10, including network security, monitoring, object storage, financial transactions, data management, and other administrative functions. The administrative servers 24 also handle the interactive service requests or instructions transmitted via the consumer system 14 by consumers. For an application involving a large base of consumers, an administrative server 24 is preferably dedicated to a particular service or function. For example, one or more servers can handle all consumer authorization requirements, and other servers can handle network management services and so forth. These administrative servers preferably support the Simple Network Management Protocol (SNMP) to enable end-to-end network administration and monitoring.

The headend system 12 also can support the distribution of programming information and other services via an analog distribution system 38 that is coupled to the distribution network 16. This distribution of analog formatted signals can be handled by a separate headend system associated with a community antenna television (CATV) system. The headend of the CATV system typically supports satellite-delivered video and audio programs, over-the-air broadcast television station signals, and broadcast network signal feeds delivered by microwave and other communications systems.

The distribution network 16 is a two-way communications network that connects the headend system 12 to various community distribution points of the consumer system 14 and, in turn, to individual neighborhood nodes for delivery to consumers of services supplied by the interactive television network 10. The distribution network 16 comprises one or more downstream channels supporting transmissions from the headend system to the consumer system and one or more upstream channels for carrying transmissions from the consumer system to the headend system. This bidirectional communications network supports delivery of programming information via the headend system 12 to each consumer and the delivery of requests for programming information by a consumer to the headend system 12. The distribution network 16 can be implemented by a microwave distribution system, a telephone system, coaxial cables, optical fibers, or any combination of these delivery systems. However, the preferred distribution network is implemented by a combination of hybrid optical fiber/coaxial cable (HFC) and optical fiber-to-the-curb (FTTC).

Those persons skilled in the art will appreciate that the programming information delivered over the distribution network 16 typically comprises signals representing video, audio, or other programming contents. Programming information can be delivered in digital format, analog format, or a combination of both analog and digital formats. For the preferred embodiment, television-related programming is delivered as a stream of digital video and/or audio signals in a compressed digital data stream, including conventional MPEG-1 and MPEG-2 compressed video streams. Likewise, requests or instructions issued by consumers via the consumer system 14 are preferably formatted as digital signals.

The CMS system 22 and the administrative servers 24 are connected to the distribution network 16 via an ATM switching system 40. The ATM switching system 40 supports network switching requirements for delivery by the headend system 12 of digital data streams carrying multimedia content and the handling of interactive service requests from consumers.

Because the interactive television network 10 is a two-way communications system, the ATM switching system 40 preferably connects to the distribution network 16 via modulation/demodulation devices. The downstream channels of the distribution network 16 can be connected to the ATM switching system 40 via digital modulators 42, and the reverse channels of the distribution network 16 are connected to reverse channel receivers 44.

Each consumer within a neighborhood node of the consumer system 14 is connected to the distribution network 16 via a subscriber drop cable 46, which is typically part of a local cable network administered by a multiple service operator (MSO). The drop cable 46 is typically a coaxial cable or optical fiber connected to a set-top terminal 48 or set-top box located at the consumer's location. This combination of the drop cable 46 and the set-top terminal 48 operates as a "tap" into the distribution network 16 and allows the consumer (1) to receive program modules and programming information distributed by the headend system 12 and (2) to transmit requests or instructions to the headend system 12. For example, the set-top terminal 48 can accept and convert signals carrying programming information in a format compatible for presentation by an output device 50, such as a television or a computer system. This output device 50, which can be connected to the set-top terminal via a conductive path 52 such as coaxial cable, preferably includes a receiver and a display or monitor for receiving and displaying programs and program-related information. Those skilled in the art will understand that the output device 50 can be implemented as a combination of separate components, such as a receiver and a monitor, or as a single component, such as a conventional television or a general purpose computer system.

Selected operating functions of the set-top terminal 48 can be controlled by an input device 54 capable of supplying input data to the set-top terminal 48. The input device 54 can be used to transmit command signals to the set-top terminal 48 and to input character-based data, such as text, for processing by the set-top terminal 48. For example, the input device 54 can be used to control the position of a display object presented by the output device or to enter text for conducting a service-related transaction supported by the interactive television network 10. The input device 54 can be implemented as one or more devices for inputting data, including a handheld control, a keyboard, a mouse device, a game control, a joystick, a pen or stylus, a trackball, or a trackpad. For the preferred embodiment, the input device 54 is implemented as a handheld remote control capable of transmitting infrared signals carrying commands for controlling the operation of the set-top terminal 48. The remote control can include a keypad having distinct keys to control direction (up, down, left, right), to control relative changes in volume or channel (increase or decrease), and to control absolute changes to channel value via a numeric key pad.

The Set-Top Terminal

Figure 2:
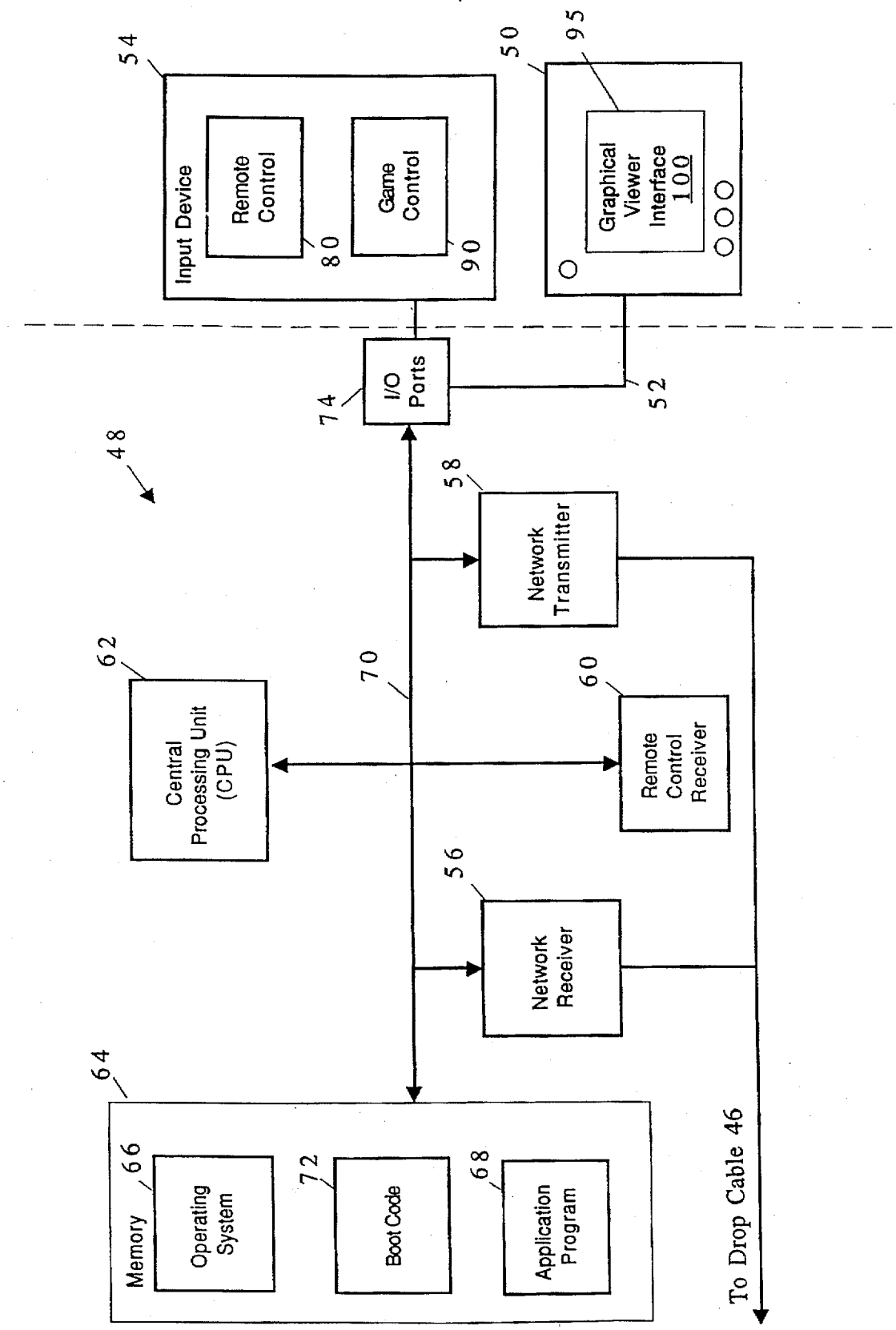
FIG. 2 illustrates the equipment located at the viewer's end of the system illustrated in FIG. 1.

FIG. 2 illustrates the basic components of the set-top terminal 48. Turning now to FIGS. 1 and 2, the primary components for the set-top terminal 48 include a network receiver 56, a network transmitter 58, a remote control receiver 60, a central processing unit (CPU) 62, and memory 64. These components are connected by a system bus 70, which can carry control, address, and data signals. The network receiver 56 conducts tuning operations for receiving a selected channel of the interactive network 10 and decoding operations for decoding compressed digitized data supplied via the interactive network 10. For example, the set-top terminal 48 can include MPEG decoding capability for converting the compressed digitized data into standard National Television Standard Committee (NTSC) video signals for reception by a conventional television. The network transmitter 58 transmits requests for programming information and related instructions for processing by the headend system 12. The network receiver 56 and the network transmitter 58 can be connected to the distribution network 16 via the drop cable 46. The remote control receiver 60, which is preferably implemented as an infrared receiving device, can decode signals carrying the commands issued by the input device 50, such as a remote control 80.

The CPU 62, which is connected to the network receiver and transmitter 56 and 58 as well as to the remote control receiver 60, controls the operations of the set-top terminal 48 and supports the rendering of graphical images of the user interface. The CPU 62 is typically implemented by at least one microprocessor, such as the model 80486 or the "PENTIUM" microprocessor manufactured by Intel Corporation, Santa Clara, Calif. The CPU 62 communicates, by means of control, address, and data signals, with the remaining components of the set-top terminal 48 through the system bus 70. The CPU 62 operates in conjunction with the operating system 66 to retrieve, process, store, and display data. It will be appreciated that the processing functions of the CPU 62 may be divided among two or more microprocessors to support the presentation of a graphics-intensive user interface. For example, a microprocessor may be dedicated to control operations associated with the bi-directional communications with the headend system 12, and another microprocessor may be dedicated to the generation of graphics.

The memory 64, which is connected to the CPU 62, is useful for storing one or more program modules and data associated with set-top terminal operations. Program modules stored in the memory 64 can include an operating system 66 and one or more application programs 68. The memory 64 can be implemented as a combination of dynamic memory, such as random access memory (RAM), and static memory, such as read only memory (ROM).

The operating system 66 comprises a set of computer programs that control the internal functions of the set-top terminal and support the execution of other program modules, including application programs 68. The preferred operating system 66 supports a graphics-based presentation of program-related information, including control items that visually represent control functions of the operating system and other program modules. A control item is any visual image representing a control object that can be manipulated by the user to perform an operation. The operating system 66 can receive and interpret input data received from the input device 54 via the remote control receiver 60. It will be appreciated that a user can "select" and "launch" control items by the use of the input device 54 in a manner similar to the computer arts.

For the preferred set-top terminal 48, the memory includes a ROM containing at least a portion of program module representing "boot code" 72 for initializing the operations of the set-top terminal 48. Upon power-up of the set-top terminal 48, the boot code 72 initiates a request for the headend system 12 to download certain program modules, including the operating system 66 and one or more application programs 68. The program modules can be stored within the memory 64 of the set-top terminal 48. This downloading process allows the headend system 12 to easily update the program modules used in set-top terminals 48 throughout the interactive network 10. For example, the application programs 68 may reside within the set-top terminal 48 only during actual use of the features of these programs; otherwise, these application programs reside at the headend system 12. Thus, it will be appreciated that the preferred set-top terminal 48 relies heavily upon data storage mechanisms located at the headend system 12 rather than on data storage mechanisms within the set-top terminal 48 itself.

The set-top terminal 48 can be connected to a peripheral device via input/output (I/O) ports 74. The I/O ports 74 support the connection of the system bus 70 to a connected peripheral device. For example, the output device 50 can be connected to the I/O ports 74 via a conductor 52. Likewise, an input device 54, such as a game control 90, can be connected to the I/O ports 74. In contrast to the remote control 80, which communicates with the remote control receiver 60 via a wireless communications link, other types of input devices 54 are typically connected to the I/O ports 74 via a cable. Nevertheless, those skilled in the art will appreciate that input devices 54 can communicate with the set-top terminal 48 by use of either wireless or wired communications links.

Generally, when a user first powers-up a set-top terminal 48, the set-top terminal 48 contacts the headend system 12 and requests the downloading of certain program modules, including the operating system 66. In response to loading these program modules, the preferred embodiment of the set-top terminal 48 may enter a stand-by mode to limit power consumption. In this stand-by mode, the set-top terminal can communicate with the headend system and can respond to administrative requests transmitted by the headend system 12. In the event that a user tunes to an interactive channel (typically by pressing the appropriate function key of the remote control), the set-top terminal 48 changes modes and enters the active mode. In the active mode, the set-top terminal 48 communicates with the headend system 12 to process the instructions transmitted by the remote control. For example, the set-top terminal 48 responds to a command requesting programming information by forwarding this request to the headend system 12 via the drop cable 46 and the distribution network 16. The headend system 12 responds by retrieving selected programming information from the CMS system 22 and transmitting the selected programming information via the return path provided by the distribution network 16 and the drop cable 46. The set-top terminal 48 then supplies this programming information in the proper format for presentation by the display.

The set-top terminal 48 preferably supports sprites in the following graphics modes: 24 bit, 24 bit with 8 bits of alpha, 8 bit palletized, 8 bits with alpha, and 16 bit (lower priority). The default palette consists of NTSC safe colors. Graphic modes can be mixed on the same screen (e.g., 24 and 8 bit).

There are 256 levels of transparency (alpha) that can be defined per pixel in the alpha modes. A control or focus object can use any of the specified modes for bit maps that they can contain with one mode per sprite (display region). In 8-bit palletized mode, the preferred embodiment is a single default palette that is selected to be compatible with the NTSC display. This eliminates palette flashing problems and improves performance.

Single scan lines flicker on a television display, and small patterns have artifacts and jitter. Most computer icons are made of single-pixel lines and tiny patterns that do not transfer well to television. The graphics in the interactive television environment are designed to avoid these problems. By default, the borders around control and focus elements and lines are drawn at a minimum of two pixels to avoid flicker problems. Hardware filtering also helps minimize flicker problems.

Set-top terminal 48 preferably includes set-top hardware filters that can be used on a full screen or on any portion of a screen. To specify an area on the screen, the application sets the filter property for the sprite. Filters are specified on a per-sprite basis and must encompass the entire sprite. The top-most sprite defines whether filtering is enabled or not for the region covered by the sprite. If a sprite with filtering and transparent areas overlaps a sprite without transparency, then the bottom sprite is filtered in the overlapping regions that are transparent in the top sprite.

A small set of three to four default fonts is built into the interactive television graphical user interface system. The system fonts provided are "TRUETYPE" fonts to allow for maximum flexibility. Applications can also download additional fonts if needed. Hardware filtering applied to frames containing text smoothes font edges for better readability. Alpha channel blending is optionally available as an additional smoothing option. Font requirements are driven by the application needs and the amount of available storage space.

The set-top terminal 48 preferably supports three digital and one analog stream of video. The digital streams can be any division of one 640 by 480 screen. A control object may incorporate a video display by calling (i.e., interfacing with) a predefined audio/video (A/V) element. An A/V control element can be displayed in a layer with other windows of video or graphics on other layers either above or below the A/V control item layer. The shape of the video window for a control item can be skewed, compressed, or enlarged. All A/V elements can have 30 frames per second (fps). A color is specified to enable graphics or other video images to be placed over a video image. Alpha can be layered on top of an A/V element to simulate fades or to layer translucent or opaque color over video.

The set-top terminal 48 preferably supports one analog and one digital stream of stereo audio. The audio streams can be mixed together and synchronized. Digital audio can be provided by a stream or from memory. The digital formats supported preferably include: MPEG, WAV, and MIDI.

The set-top terminal 48 preferably also supports standard television effects for transitions that can be applied to any control item or its contents. Effects such as wipes, dissolves, and tumbles are supported for both video and graphics. Video effects can apply from one stream to another and from one stream to solid color such as black.

Viewer Navigation

Referring to FIG. 2, a viewer manipulates the cursor and the control and focus items displayed on the screen through commands via the input device 54, preferably a handheld remote control. While manipulating the remote control, the viewer is preferably observing the screen 95 of the output device 50, preferably a television, which is displaying a graphical viewer interface 100. Sound elements may also be used in association with the graphical viewer interface.

Referring to FIG. 3, a viewer may be presented via the graphical viewer interface 100 with a plurality of control items, 102, 103, and 104. FIG. 3A shows "non-modal" control items 102 and 103 that are simple buttons, and "modal" control item 104 that is a "spin dial." A non-modal control item, such as a button, is used to execute a single action. A modal control item, such as a spin dial, has an internal selection that can be changed by the viewer. As shown in FIG. 3A, control items may vary in size and shape. Moreover, control items may be animated and may be custom designed by application programmers.

The viewer must know which object is going to be acted upon when a viewer transmits an action command. Focus indicates which control item is selected. Focus may be indicated by altering the view of the selected control item or by associating a separate focus item with the selected control item. Referring to FIG. 3A, focus ring 105 displayed in association with control item 102 indicates that control item 102 has the focus (i.e., is selected). Similarly, referring to FIG. 3B, focus ring 105' displayed in association with control item 104 indicates that control item 104 has the focus. A focus item can be animated by a color or luminance change, size change, or other visual or audio component. Animating the focus greatly increases the visibility.

Once a control item is selected, the viewer can then act on that control item. If the control item is a non-modal control item such as a button, a viewer can transmit an action command to the button which causes the execution of the action associated with the button. If the control item is modal with a selection of actions associated with it, the viewer can manipulate and select the contents of the control item. Once the control item displays the desired action, the viewer can execute the selection.

A viewer must be able to manipulate the graphical viewer interface 100 using input device 54, typically a handheld remote control, in order to make and communicate selections to the interactive television system 10. According to the preferred embodiment of the present invention, there is a core set of control functions provided on remote control unit 80. These controls are the most commonly used and are least suited to be on-screen. The remote control 80 is the viewer's physical interface into the interactive television system. To provide maximum flexibility, there are several types of remote control units 80 that are supported by the set-top terminal 48.

A remote control comprising only the core set of controls is referred to as a "primary remote," and will be described in detail. The primary remote is the main remote control unit allowing a viewer to interact with the interactive television system 10, and is sufficient for conducting basic interaction with the system including viewer selection and execution of options presented by control items. An example of primary remote control 80 is shown in FIG. 4. The primary remote control 80 is not intended for high-action game use; its purpose is single-viewer, day-to-day usage.

Although the primary remote control 80 is the primary input device, various input devices are supported by the preferred embodiment of the present invention including TV style game controllers, mouse, and keyboard. The wired game controllers are designed for two-handed and optionally two-player action use. Wireless game controls may be optionally provided. A keyboard can be supported for personal mail, searching, and other text applications. For example, a standard set-top terminal 48 can support a small keyboard designed to be used in a seated position.

A primary remote control 80 includes at least the elements described below in connection with FIG. 4. Power key 112 turns on power for the television 50 and set-top terminal 48. Thumbpad 114 is a directional pad intended for manipulation by a viewer's thumb used to maneuver a pointer, such as a cursor or a focus item, around the screen. Action key 116 communicates an action command desired by a viewer, typically the execution of a function associated with a selected control item. "A" key 118 activates a program module-defined function. "B" key 120 activates a program module-defined function. Menu key 122 brings up a navigator to assist the viewer in manipulating the pointer. Help key 124 displays context-sensitive information/help. Channel selector 126 moves the channel selection up or down. Volume selector 128 increases or decreases volume level of the television. Number pad 130 includes number keys 0–9. Mute switch 132 turns off or restores all audio. Help switch 134 initiates or discontinues an on-screen help function. Additional remote control functions are also supported by the preferred embodiment and may be included on a remote control unit. Such additional functions may include a TV/VCR switch, a "jump to last channel" switch, and "transport controls" including play, stop, pause, fast forward, and rewind.

A cursor is an on-screen graphical pointer used to show the viewer where the viewer is pointing. According to the preferred embodiment of the present invention, the cursor for the interactive television viewer interface 100 is larger than a traditional computer cursor, supports multiple colors, and can be animated. Application programs can also define a custom cursor. For example, a music video application could display a microphone for a cursor.

The preferred device for navigating a pointer such as a cursor or a focus item on the screen is the thumbpad 114 on remote control 80. The thumbpad allows a viewer to navigate a pointer, such as a cursor or focus item. The basic requirement of a viewer navigation interface is to give the viewer the ability to jump or "tab" a focus item between control items and/or to "roam" a cursor around on the screen causing a focus item to follow the cursor in a manner that can be readily understood by the viewer.

A primary remote control 80 preferably operates in one of two modes, a "roam mode" or a "tab mode." The set-top terminal 48 preferably supports cursor movement in sixteen different directions in the roam mode and eight directions in the tab mode. The thumbpad preferably has a force-sensing capability which can be used to roam or scroll through a list quickly or slowly depending on the amount of pressure placed on the thumbpad. The force-sensing capability applies when roaming within an image and when scrolling through a list of items.

When in the tab mode, the focus jumps directly from one control item to another in response to navigational commands from the viewer. The viewer communicates navigational commands using the thumbpad 114 on the primary remote. Tab mode operation and a simple form of focus animation are illustrated by FIG. 5. At FIG. 5A, focus item 110 is shown in association with control item 102. As shown in FIGS. 5A, 5B and 5C, the focus item may be animated by sequentially varying the display between the positions illustrated by focus items 110, 110' and 110".Those skilled in the art will appreciate that many forms of animation are possible, all of which are within the scope of the present invention. At FIG. 5D, the focus item 110b has been relocated to a position where it indicates that control item 103 has been selected by the viewer. Referring back to FIG. 4, in the tab mode, the transition from FIG. 5C to FIG. 5D occurs in direct response to a viewer thumbpad 114 command. No cursor manipulation is required or provided.

The tab model requires a relatively simple screen layout with a relatively small number of control items. To keep a viewer from having to tab through too many control items to make a selection, and for particular applications or games that may use hidden or nonobvious controls, the roam mode is provided as an alternative navigation mode.

The roam navigation mode uses a cursor on the screen to indicate a location that is being pointed to on the screen. A focus item optionally follows the location of the cursor. FIG. 6 illustrates the operation of the roam mode. Referring to FIGS. 4 and 6, the viewer manipulates the cursor 120 via the thumbpad control 114 on the primary remote control 80. The action key 116 on the remote control typically causes the execution of a function associated with the selected control item. The roam mode is useful for applications where the viewer can choose from a variety of options that may not necessarily appear as discrete control items or have a separate focus item.

Referring again to FIG. 6, when navigation is in the roam mode, each control item may have an unseen focus zone 130 around it, which makes it easier for the viewer to select a control item. If the cursor is moved inside a focus zone, then the associated control item is automatically selected. The focus zone can be made any size or turned off if desired. When roaming, the cursor is typically constrained to the visible area of the screen thus preventing a novice viewer from roaming off the screen and "losing" the cursor.

Figure 6A:
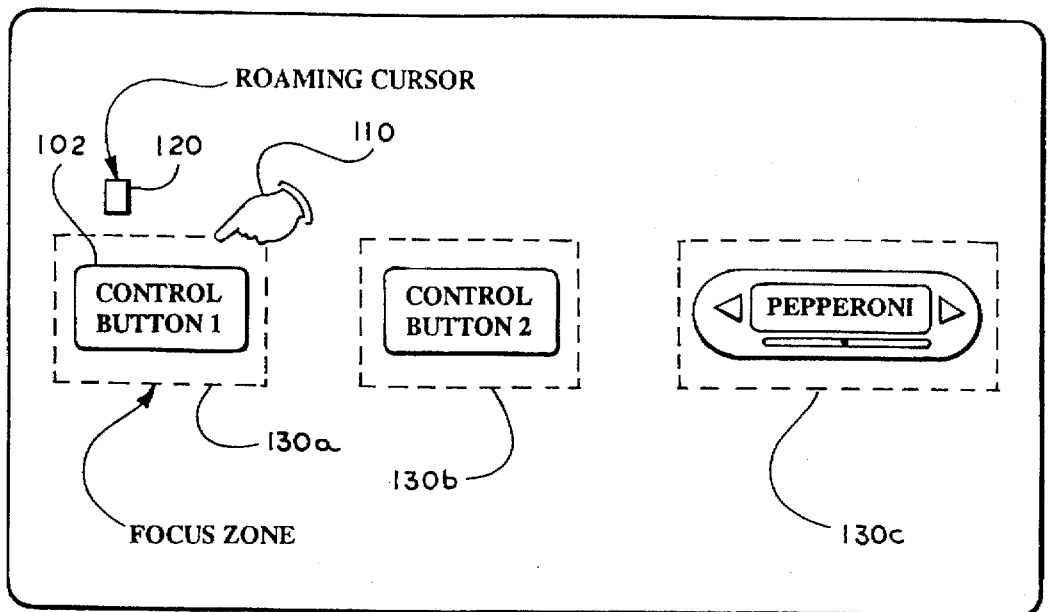
Figure 6B:
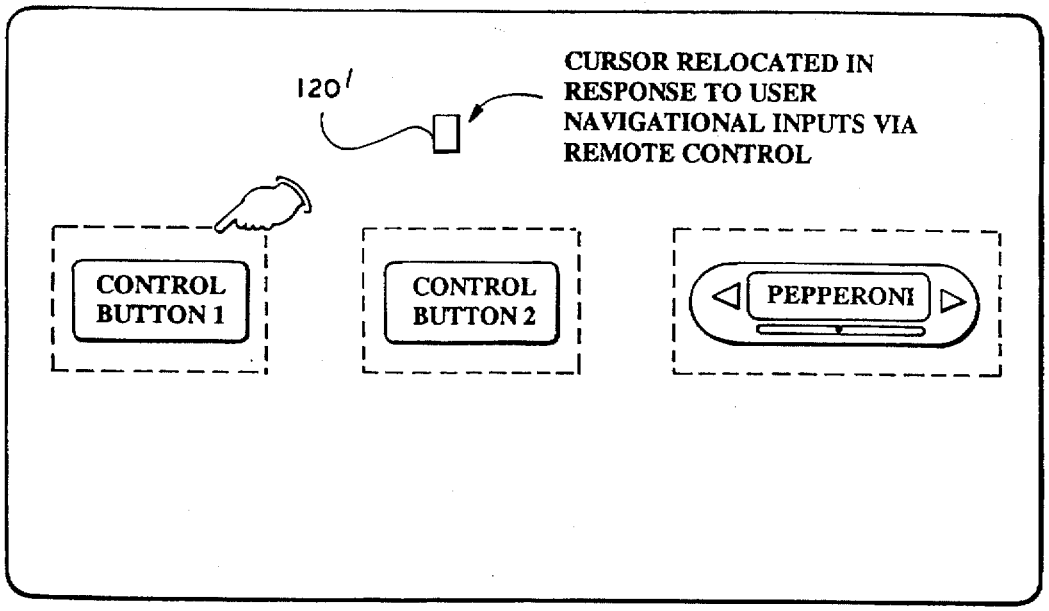
Figure 6C:
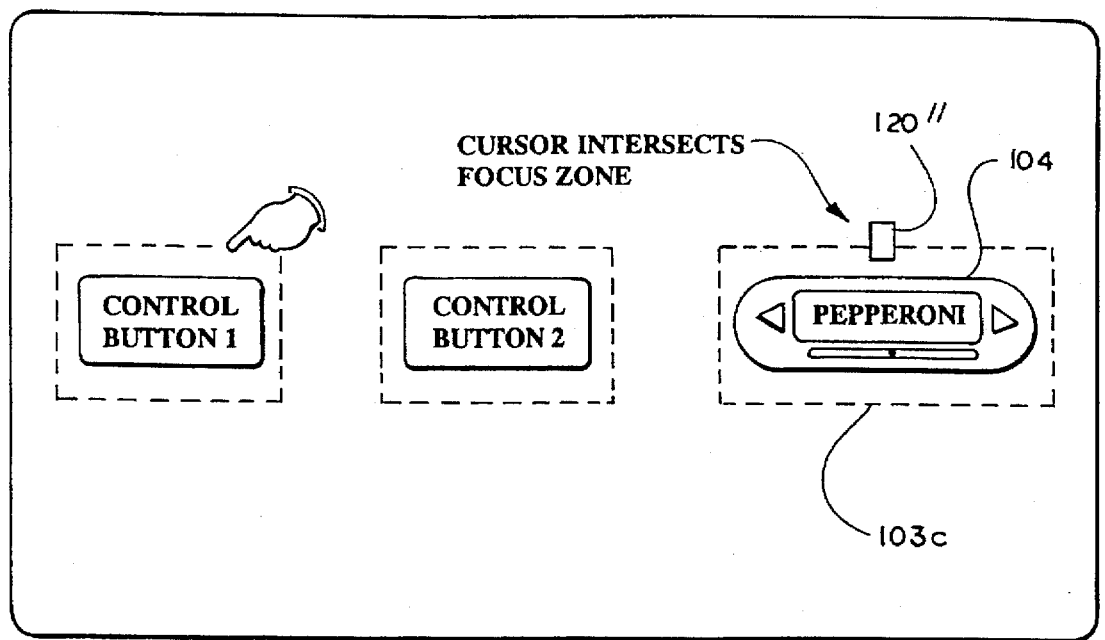
Figure 6D:
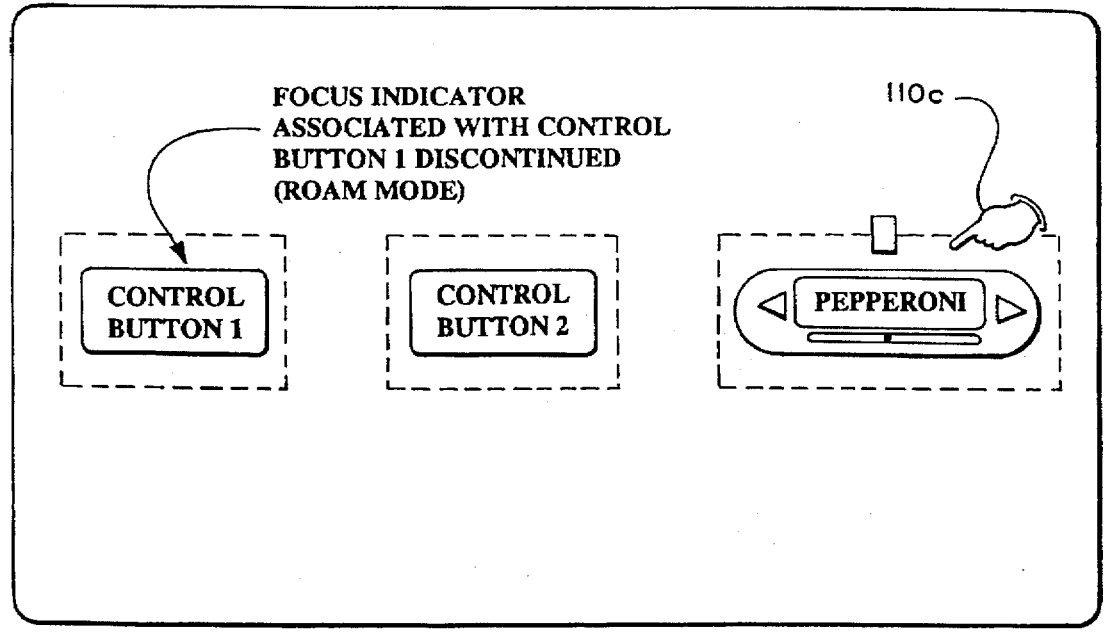
Figure 6E:
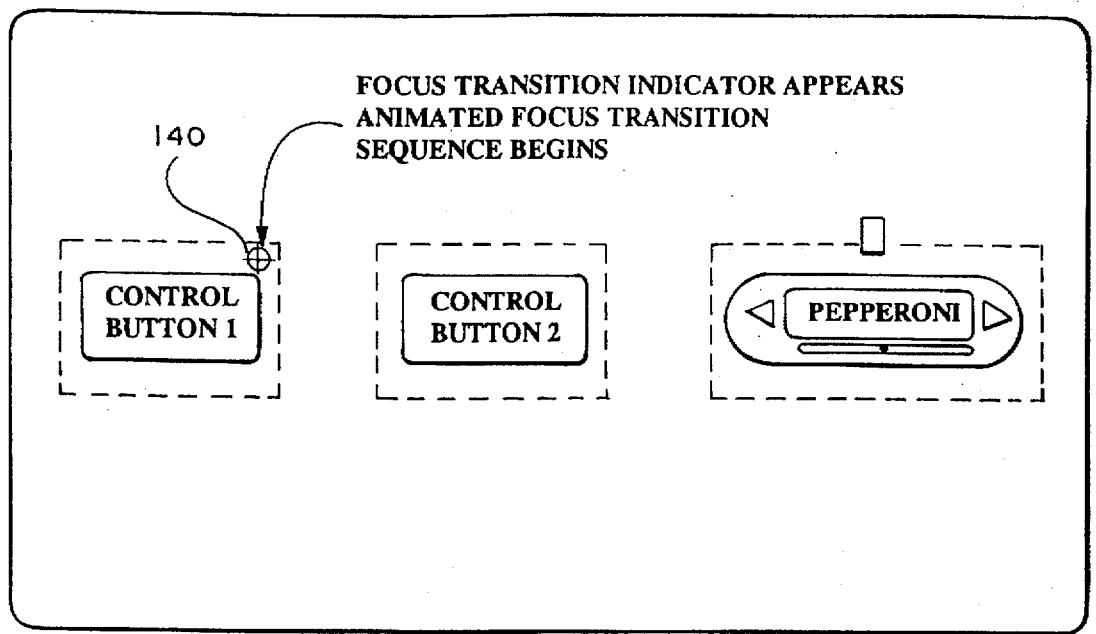

Referring now to FIG. 4 and the transition from FIG. 6A to FIG. 6B, the relocation of the cursor 120' on the television screen occurs in response to user commands via thumbpad 114 on primary remote control 80. FIG. 6A shows focus item 110 in association with control item 102, indicating that control item 102 currently has the focus. At FIG. 6C, a viewer has navigated the cursor 120" to a position that intersects a focus zone 130c associated with spin dial 104, indicating that the viewer has selected spin dial 104 to receive the focus. As shown in FIG. 6D, this causes the focus item 110 associated with control item 102 to be disconnected, and a new focus item to appear at position 110c where it indicates that spin dial 104 is currently selected. Those skilled in the art will appreciate that focus item 110c could differ from focus item 110 in appearance or animation.

Figure 6F:
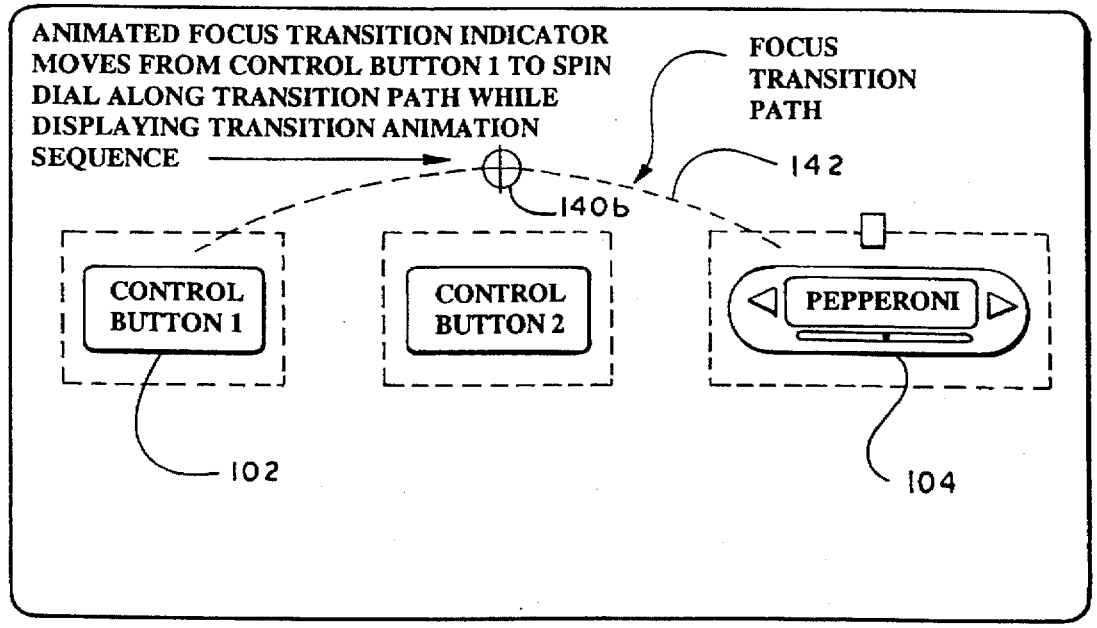
Figure 6G:
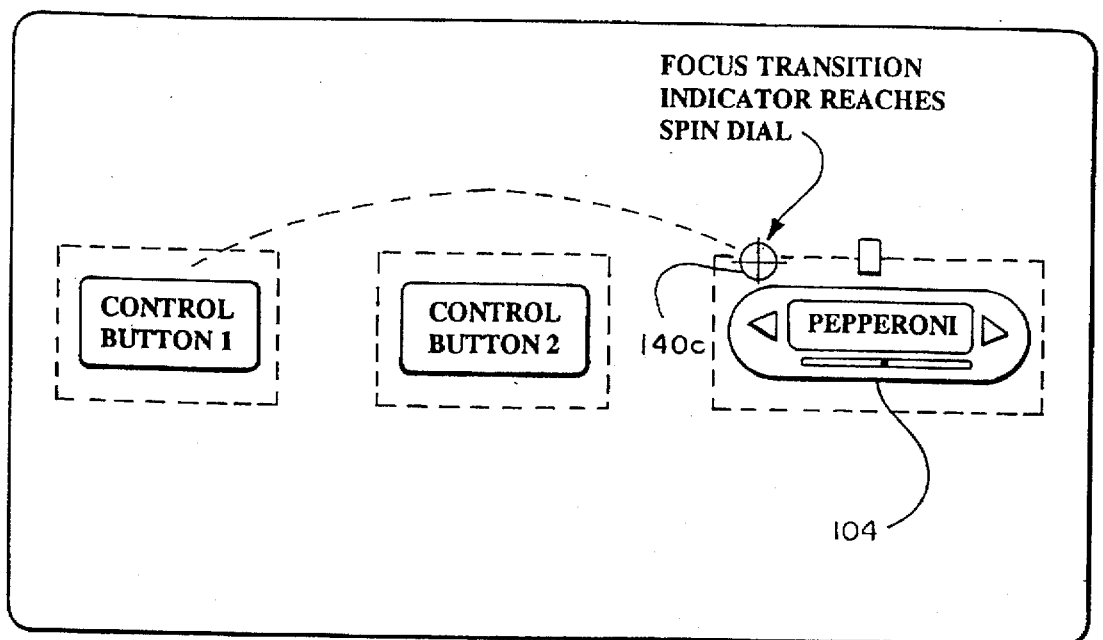
Figure 6H:
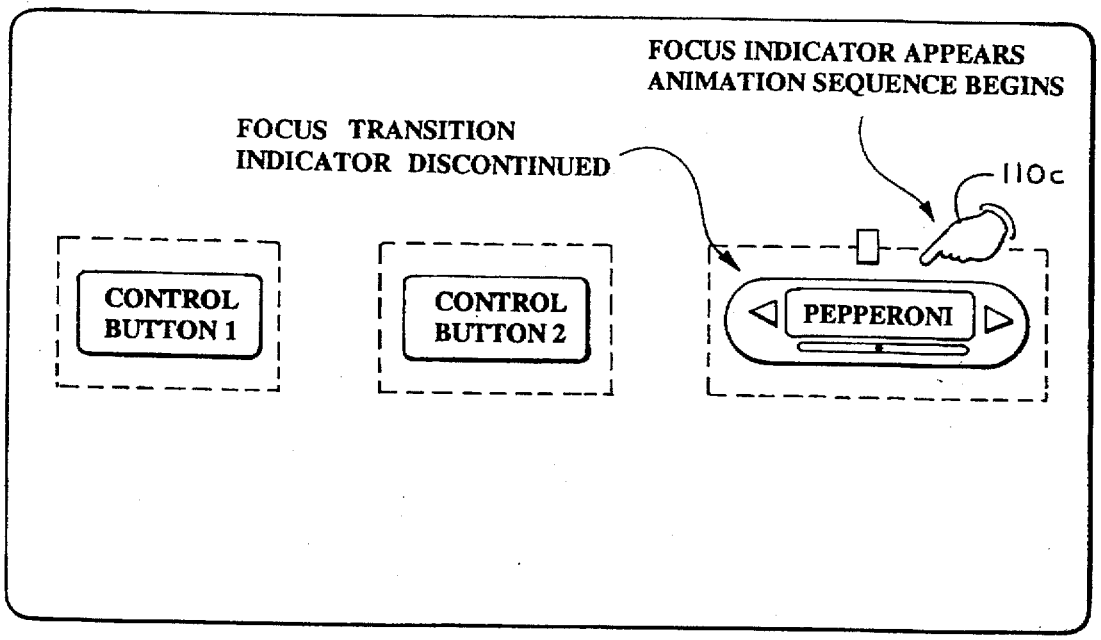

To aid a user in following a selection change, an animated focus transition item may be displayed on the screen. FIG. 6 shows an example of an animated focus transition item 140 wherein the sequence displayed to the viewer would not transition directly from FIG. 6C to FIG. 6D but would first sequence through the steps illustrated by FIGS. 6E through 6H. At FIG. 6E focus item 110 is discontinued, and focus transition item 140 appears. An animation may be associated with the focus transition item 140. As shown in FIG. 6F, the focus transition item has been relocated to position 140b as it moves along a focus transition path 142 between the control item 102 previously holding the focus and the control item 104 receiving the focus. At FIG. 6G, the focus transition item has moved to position 140c which is close to control item 104. At this point, as shown in FIG. 6H, the focus transition item 140 is discontinued, and the focus item 110c appears in association with control item 104.

Those skilled in the art will appreciate that many forms of animation in association with focus transition items are possible, all of which are within the scope of the present invention. For example, a video display of a small automobile could be displayed along with an associated sound track.

Graphical Viewer Interface Structure

Referring to FIG. 2, the set-top terminal 48 supports a graphical viewer interface 100 for the interactive television system 10. Graphical user interfaces for conventional computer systems are well known in the desktop computer environment. There are a number of differences between a conventional graphical user interface and an interactive television graphical viewer interface according to the preferred embodiment of the present invention. For example, the interactive television graphical viewer interface does not include the following traditional elements of a desktop computer base graphical user interface: system menus, menu bars, multiple document interface, iconized windows, system user interface for changing window size or position, dynamic data exchange, advanced object linking and embedding features (e.g., compound documents), a clipboard, or double-click input capabilities.

In an interactive television graphical viewer interface 100 according to the preferred embodiment of the present invention, all control and focus objects operate in an object-oriented computer system. Simplified viewer interface control items are designed specifically for the interactive television environment in both appearance and behavior. An easy to use primary remote control 80 is the primary input device. Flicker and crawl effects are minimized with hardware filtering, minimum two pixel-width lines, low-contrast pallet, and judicious graphic design including three dimensional depictions.

According to the preferred embodiment, all services available through the interactive television system 10 are programmed via interfaces on objects. To modify the default properties, get status, or otherwise communicate with an object, the application uses a pointer to a known interface offered by the object and calls the desired methods on that interface. A number of standard objects are provided for use by application programs. For example, standard focus objects, standard control objects, such as buttons, spin dials, and text elements, and sprites are standard objects that may be programmed via interfaces.

An application programmer can customize control and focus items to create a unique look. Operation of a control object can be changed to some extent, but to ensure consistency among different applications, the fundamental operation of each control object is predetermined. All control and focus objects use standard object-oriented programming interfaces and are built from a set of base element objects. An individual control object or focus object can support animation, sound, and video elements. For example, a sequence of sprites may be displayed in a predetermined order to create a cartoon-like animation.

A standard set of element objects are provided to application programmers that are intended to provide fundamental building blocks for applications. Control and focus elements generally contain the basic elements from which control and focus items may be constructed, such as frames, picture and text elements, and containers for custom designed audio and video elements. In addition, application writers have the flexibility to add new control and focus objects and elements to incorporate new designs and effects into applications.

The interactive television graphical viewer interface system 100 may be implemented by adding additional properties to an operating system such as "WINDOWS". Alternatively, graphical viewer interface system 100 may be implemented using an object hierarchy in which a parent is a container object that holds one or more other objects. A child is an object contained within another. Children, in turn, may contain objects, which also contain other children. Those skilled in the art will appreciate the containership principles of object-oriented programming techniques.

Control and focus objects have properties that determine the behavior and appearance of control and focus items. All control and focus objects share a container interface that includes the capability of adding objects (i.e., all control and focus objects can serve as containers). Any object can be contained by an another object in the hierarchy. However, to participate as a container, objects must support the container interface. Objects that are not containers can only be contained as a final leaf in the hierarchy tree. Children are tracked via pointers to their patents. The ability to work with and do anything useful with objects that are not containers depends on their interfaces being known by a parent object. If an object that is not a container is added to the hierarchy, it is stored, included in enumerations, and released upon release of the parent, but the object is otherwise ignored.

Although elements are objects in their own right, control and focus elements can be thought of as building blocks for more complex control and focus objects. Those skilled in the art will appreciate that elements, as standard objects with predefined properties, can be used to build more complex objects using the containership capability of object-oriented programming techniques. Compound objects can be used and contained in the same fashion as simple ones. Elements not only supply the routine visual components of control and focus objects such as frames and text elements but provide containers for custom designed effects such as animation, sound, or data handling. With this approach, object appearance, and to some extent functionality, is augmented by adding an object to a container object. This approach also provides the flexibility of altering a standard control or focus object's appearance by substituting custom or nonstandard objects in place of the standard ones.

Control and focus objects include or interface with element objects to produce active animation, sound, and video support, as well as advanced graphical effects such as fades and wipes. The display of screen items associated with control and focus objects may be via sprites only, i.e., rather than a frame buffer there are multiple sprite-based display buffers operating simultaneously, each of which may be of any desired size. Child control elements rendered as separate sprites are not constrained to their parent's display area. For memory efficiency, a frame buffer can be combined with individual sprites that are used when appropriate for displaying animation effects.

Except for parentless top-level frames, each object in the hierarchy has one and only one parent but can contain multiple children. The hierarchy is distributed; that is, it is maintained by the objects themselves. An object serving as a container maintains a list of pointers to its child objects in display order, referred to herein as the "relative Z order". In addition, every contained object also stores a pointer to its parent object. Thus, given an interface pointer on any object, the object tree can be traversed in either direction (up or down), by either operating system or application code.

As discussed above, a control object is a parent container that may contain a number of child objects. In this manner, control items may be layered or nested within other control items. According to one aspect of the preferred embodiment, a parent control object controls the navigation mode of its children control objects. Thus, when a parent control item has the focus, navigation among child control items contained in the parent is set by the parent's navigation mode. With this capability, it is possible to mix navigation modes for different uses. For example, a screen display may contain an roam image that the viewer interacts with in the roam mode. Outside this image, but within the same screen display, there may be buttons that can be navigated to in the tab mode once the viewer roams outside the image. Tabbing back to the roam image reactivates roam mode. Thus, a control object may constrain navigation for items inside itself.

Block Diagram

FIG. 7 is a block diagram of the components of the preferred embodiment of the present invention that relate to the control of the behavior and appearance of control and focus items. Each element shown in FIG. 7 is discussed below with the exception of the remote control unit which was discussed above under the heading "Viewer Navigation."

Program Modules

Referring to FIG. 7, program modules 202 are operating system or application code. Program modules interface with the focus manager 206 to control how the navigation controls behave during the application. Referring to FIG. 2, operating system and application programmers design program modules that include focus and control objects and elements that are transmitted from the headend 12 to the set-top terminal 48 where they control the appearance and behavior of graphical viewer interface 100. Program modules may provide custom designed objects and may alter the behavior and appearance of standard objects. For example, program modules may interface with the focus manager causing restricted cursor movement, for example, to four directions (up, down, left, right) or eight directions of movement (by adding +/–45 degree angles). Typically, application program modules determine the appearance and behavior of control and focus items displayed to the viewer. Application program modules also usually set the mode of navigation including the number of directions allowed in tab mode by communicating with the focus manager, and provide an initial focus location upon application start up.

Remote Control Driver

Referring to FIGS. 2 and 7, the remote control driver 204 handles all input from the user input device 54. The driver supports the primary remote control 80 and any of the additional input devices such as a keyboard or game controller. The remote control driver receives input from the remote control and sends the appropriate events and vector data to the focus manager 206.

Recall that the focus manager operates in two modes, roam and tab, that are typically set by application program modules. Referring now to FIG. 4, in roam mode the focus manager moves the cursor in response to pressure sensitive direction navigation actions from the force sensor on thumbpad 114. In tab mode the direction vectors are translated to discrete directions to move the focus. Any magnitude value associated with the vector from the force sensor on thumbpad 114 is ignored. By default, no cursor is displayed in tab mode, though it can be turned on, if desired, by an application program module to function as a type of additional focus item.

The Focus Manager

The focus manager 206 is a system module that decides which control object has the focus and supports on-screen viewer navigation between the control items displayed on the screen. Referring to FIGS. 4 and 7, the focus manager determines which control item displayed on the screen is selected based on viewer input from the remote control 80. The focus manager provides an interface for the remote control driver 204, which receives input from the remote control. In addition, program modules 202 may interface with the focus manager to register with the focus manager information defining the appearance of focus items, the location of control items displayed on the screen, whether control items are modal or non-modal, and the initial location of the focus.

Control objects that are to be enabled (i.e., can hold the focus) must register with the focus manager 206 when they are enabled and must unregister with the focus manager when disabled or destroyed. Based on the resulting list of eligible controls and their current position on the display screen, the focus manager computes which registered control object should gain focus on any eligible focus change event and notifies the selected control object that it has been assigned the focus. On this notification, the control object registers for input events that it is interested in, changes its appearance as appropriate, and then waits for the registered event notifications.

Referring now to FIG. 4, when a control object is modal, some thumbpad 114 directions, which normally serve to navigate between control items, are instead used to "spin" through choices and are thus "consumed" by the modal control object. Control objects with focus may pass events that they do not "consume" to the focus manager. The focus manager monitors events and moves the focus whenever a known navigation control or event is encountered. The focus manager tells the control object previously holding the focus to lose focus and tells the control object receiving the focus to acquire focus.

A modal control object decides which events to pass to the focus manager. The thumbpad 114 commands that are used to maneuver within a control object in a modal state are known only to the modal control object. The control object determines whether thumbpad commands are consumed and whether those that are not consumed are passed to the focus manager. When a control object loses focus, it may change its appearance and cancel any event registrations that were contracted for when it acquired the focus.

Hit testing is the process performed by the focus manager 206 to determine the owner of a pixel at which some action is taking place, for example, a cursor move or key click. Hit testing is used by the focus manager in roam mode to resolve whether the focus should change. Hit testing works with irregular-shaped regions. Although sprites may appear irregular in shape, all sprites are rectangular but can be made to appear irregular by using transparent pixels. Taking advantage of the rectangular shape, the sprite manager first determines whether a tested location is within a sprite, and if so then checks for a transparent pixel at the specified location within the sprite. If a transparent pixel is found, then it is treated as a miss for that sprite, and the search continues.

Those skilled in the art will appreciate that an alpha channel is used to control the amount of fading associated with a visual display. If a sprite has a pixel with an alpha channel value indicating partial transparency and if there is a lower-level sprite from the same application with a non-transparent pixel in the same hit location, only the parent of the topmost affected sprite is notified. Thus, if a hit pixel is not fully transparent, then it is considered a valid hit. The parent of the hit region is given focus.

Note that the same control object might own several different sprites via its children. A hit on any of a control object's children, whether rendered in a separate sprite or a shared sprite and even if widely separated on the screen from the parent at the time, is considered a hit on the parent control.

With multiple applications running, when the focus manager gets a hit on a control item that belongs to an application that is not entirely on top, it brings the hit application to the top. Bringing an application to the top is a way of changing the application that receives action commands and is equivalent to giving the focus to the application brought to the top. In this manner, changing focus is a way to switch applications.

Focus Objects

Referring again to FIG. 7, a focus object 208 is a container object that typically contains focus element objects. The focus object interfaces with the focus manager 206 and control objects 210 to obtain information to aid in the rendering of a focus item. Typically, an application program will use a default focus object or will load one or more focus objects that have been custom designed by an application programmer for use with the particular application.

The focus item 105 shown in FIG. 3A in association with control item 102 a simple "focus ring" disposed around the perimeter of the control item, in this case a button. Focus ring 105 is separate from control item 102. Other focus items could appear integral to the selected control item, such as spinning or flashing the selected control item. Focus ring 105' shown in FIG. 3B is disposed around the perimeter of control item 104, a spin dial. Pursuant to the preferred embodiment of the present invention, standard focus items will be provided to application programmers in advance, such as rings, arrows, and pointing fingers. For example, the focus ring illustrated in FIG. 3 is an example of a standard focus item. In addition, standard elements may be incorporated into focus items such as frames and text elements. Standard elements may also be incorporated into custom designed effects such as animation and a sound track.

Referring to FIG. 7, according to the preferred embodiment of the present invention, the focus object 208 has the ability to interrogate a control object 210 with which it will be associated to determine parameters such as the size, shape, and location of the control item so that the display of the focus item may be conformed to the display of the control item. Thus, application programmers can easily specify a single focus item, such as a focus ring, for a plurality of control items with different sizes and shapes, and the focus object will automatically vary the size and shape of the focus item to conform to the size and shape of the associated control item.

For example, referring now to the transition from FIG. 3A to FIG. 3B, a programmer may select a particular focus item such as focus ring 105, which will then automatically conform itself to the location and shape of different control items by interrogating the focus manager and one or more control objects as illustrated by comparing focus ring 105 with focus ring 105'.

In addition, a control object may specify to a focus object upon interrogation the appearance of the focus item that will be associated with it including an animation or sound track. For example, referring back to FIG. 6, a control object may pass information to a focus object instructing the focus object to display transitory focus item, such as item 140. Those skilled in the art will appreciate that constructing the focus indicator as an object allows great flexibility in the design of focus items and in the distribution of focus item defining information among various objects through the containership feature inherent in object-oriented programming techniques.

Control Objects

Referring to FIG. 7, a control object 210 is the mechanism which services a viewer's input choices. Certain control objects are standard and supplied in advance to application programmers. For example, standard control objects may include button 810 in FIG. 8A, spin dial 820 in FIG. 8B, list box 830 in FIG. 8C, and text edit 840 shown in FIG. 8D.

Just as application programmers have the flexibility to create focus items that vary in appearance and content, they have the flexibility to create control items that vary in appearance and content. The appearance of standard control objects may be easily altered by application programmers by specifying predefined parameters, such as text and background colors and/or by adding custom designed elements such as animation or a sound track or other child elements to the control objects. Thus, application programs for the set-top terminal 48 may be built, in whole or in part, using a set of standard control and focus and objects and elements.

Control objects are stand-alone objects that can be augmented as needed. Interactive television control objects are different from conventional computer controls in that their properties are not limited to a pre-defined set of parameters. To add to or enhance an integrated television control object, the application simply adds the desired elements to the control object. An added element may be a standard element, such as a picture or text element configured with the application programmer's data, or it may be custom designed by the application programmer, such as an animation or sound track.

Although the look of a control item is intended to be easy to customize, operation is limited and should be consistent among the different applications. Referring back to FIG. 4, for example, an application program typically sets the look of a button, but regardless of the application, when a viewer presses the action key 116 on the remote control 80, the selected button should always execute the function associated with that button. Control objects typically have the following characteristics: the viewer interacts with them, they have definite states, and they are used to display information in the viewer interface.

There are two types of control objects: modal and non-modal. Referring now to FIGS. 4 and 8, non-modal controls, such as button 810, execute a single action. Modal controls, such as spin dial 820, have an internal selection that can be changed by the viewer. When a non-modal control such as a button is selected, pressing the action key 116 on the remote executes the associated command. The thumbpad 114 on the primary remote control 80 has no effect on a non-modal control other than to move on to or off of the control. On the other hand, a modal control such as a spin dial has an internal selection that the viewer can change by using the thumbpad on the remote. Once a modal control is selected, the modal state must be activated before the contents can be manipulated.

There are three ways of placing a control into its modal state. One method is to have the viewer press the action key 114 to activate and deactivate the modal state. The second method is to have the modal state change automatically when the control is selected or de-selected. Under the third method the modal state is triggered automatically when the viewer navigates to a modal control, but the viewer must press the action key 116 to exit the modal state once it has been activated. Each of the methods, manual, automatic, and selective, respectively, are discussed below. The method of modal activation depends on the need of the application program and is therefore set by the application program.

Manual modal activation is one method of modal activation. Manual modal activation requires an action by the viewer to put the control into the modal state before the control can change its contents. Referring now to FIGS. 4 and 8, for example, when a viewer selects a spin dial and then presses the action key 114 to activate the modal state, the arrows 822a and 822b on the sides of the spin dial appear to indicate to the viewer that the thumbpad 116 will now "spin" the spin dial through its list of items. After choosing an item from the spin dial list, the viewer presses the action key again, the arrows disappear, and the viewer can then use the thumbpad to move between controls.

Automatic modal activation is a second method of modal activation. Automatic modal activation places a control object in its modal state automatically when the control object receives the focus. Thus, the viewer can change the contents of the control item without having to press the action key to switch the control object into modal state. Under this method certain directional commands may operate to manipulate the modal control item, and others may operate to navigate between control items. For example, the left and right directions on the thumbpad 114 might allow the viewer to manipulate the list within a spin dial, and the up and down directions might allow the viewer to navigate between control items to change the focus. Automatic modal activation limits the types and combinations of control objects that can be used and their placement on the screen. For example, when a horizontal spin dial is set to automatic modal activation, control items cannot be placed to the left or right because it would then be impossible to navigate directly to these control items once the spin dial had been selected. Pressing the left and right sides of the thumbpad would scroll the list and would not move the selection to another control.

Selective modal activation is the third method of modal activation. In the selective modal activation the viewer is required to press the action key 116 before exiting a modal control, but the modal state is automatically activated upon navigating to a new modal control. This approach eliminates the layout constraints of the automatic modal activation/deactivation model, but this approach may be more difficult for viewers to understand. For example, it might be difficult for the viewer to discern whether pressing the action key would deactivate the modal state or execute the displayed command. Again, the application determines which type of operation will be used in a certain context.

Control and Focus Elements

The preferred embodiment of the present invention is concerned, in part, with giving program developers a standard set of elements from which to construct more complex focus and control items. Other elements and animations that may be associated with focus items, in particular, may be custom designed and added to control and focus items at the discretion of the program developer. The scope of the present invention is therefore not limited to the particular animations described herein.

Referring to FIG. 7, the focus elements 212 and control elements 214 are the building blocks that program modules use to create control and focus items with the desired text and appearance. A particular element may serve only as a control element, only as a focus element, or as either a control or focus element. Individual control and focus items are typically built using a standard set of control and focus elements. The frame is one of the primary container elements with which complex control items are built. Frames are analogous to windows in a conventional computer graphical user interface, in that frames are used for displaying groups of other items.

Thus, frames are building blocks of the preferred interface. Frames can contain graphic images, animations, video, text, and other standard elements as well as other frames. Control and focus objects are typically constructed by starting with a frame as a parent container and then adding additional elements to the frame. Frames can be positioned in absolute screen coordinates or relative to their parent. For example, a focus frame may be linked to a control frame so that the focus item is always displayed in the same manner relative to the control item. Thus, if the control item is moved, the linked focus item will move with it.

Frames can contain visual elements such as text and bit maps. These visual elements define the look of the frame. A frame supports every color depth available in the set-top terminal. Different frames can be set to different color depths on the same screen as long as they are rendered on separate sprites. A frame can contain picture elements with device-independent bit map (DIB) images in any of the color depths. A picture element can be cropped, stretched, or compressed to fill a frame, or it can be tiled to create a texture effect. The application simply adds a DIB element to the frame. A frame can similarly be used to display text. The application programmer simply adds a text element to the frame to display the desired text. Text can be aligned, justified, and wrapped inside a frame. Multiple text elements can be used as needed.

There are two standard types of backgrounds built into frames, single color and merge from one color to another over the background. Standard frames may have a border with 3-D effects, a straight line border, or no border. The "transparent" color and alpha transparency level can be set independently for each frame. Graphics or video in the frame appear to the viewer to be transparent if their color matches the "transparent" color. The alpha for the frame applies to the entire frame contents. Per pixel alpha can be specified in DIB images held by picture elements added to the frame.

In the preferred embodiment, individual control and focus items may be customized by selecting certain parameters associated with standard elements, or by adding standard or custom designed elements such as an animation to a standard element designed to accept such an effect. Thus, custom designed control and focus objects may be composed entirely of standard element objects, whereby custom designed features are achieved by adding a standard element designed to serve as a container for this purpose. However, there is nothing in the program architecture that would prevent a programmer from introducing an entirely new object into the system, provided that it was properly programmed to interface with the other objects in the system. Thus, programmers also have the flexibility to introduce new elements and objects to the system.

The following is a description of each of the standard element types included in the preferred embodiment, and a listing of their properties. Each description is preceded by a name which represents a interface supported by control and focus objects.

1. ElemShape: A shape is the basic graphical building block element. It consists of a shape type, border shadow, and background. General properties include: (1) shape (e.g., rectangle, rounded rectangle, circle, quad, sphere, torus, cube); (2) size; (3) color; and (4) position. The shape, size, color, and position can be specified either in global screen terms, inside the video safety area, or relative to a container frame.

2. ElemText: The text element is an object for displaying text on the screen. Text elements render text for control and focus objects. Because text will be widely used as a graphic element in control and focus objects, a wide variety of properties are supported. A text element has the following properties (e.g., pointers to): (1) string of characters; (2) font name; (3) font size; (4) font style (e.g., bold, italic); (5) underline; (6) color; (7) effects (e.g., shadow, outline); (8) wrap; and (9) alignment. A text element can be of mixed types. For example, a single text element can contain bold and plain text. The properties of the text element can also be changed, and a text element can have specific background and border style. The background of a text element can be transparent or a specified color.

ElemText supports alpha blending, which can be used to provide anti-aliasing to smooth out jagged edging (the stairstep effect) on text and graphics. Using an alpha channel that fades the transparency at the edges of the text gives the appearance that the text is blended into the background. Alpha specifically refers to a level of transparency that is applied to a pixel. Pixels can be transparent (full alpha), opaque (no alpha), or somewhere in between. By giving the pixels along the edge of an image a partial alpha value, the edge seems to blend into the background and to appear smoother. This allows for much smoother-looking text, especially over video where conventional anti-aliasing is not feasible. Also, all pixels can be blended for allowing partial visibility of graphics or video under the displayed text.

3. ElemA/V: This element serves as a container for motion video. Application programmers may incorporate custom video components into control and focus objects using this element. Alpha can be applied to the motion video.

4. ElemPicture: This element serves as a container for DIB image data. Application programmers may incorporate a custom picture into control or focus objects using this element. Alpha can be applied to the entire image, or the DIB data may incorporate per pixel alpha.

5. ElemList: This element is used as a container for lists of items. For example, items can be added or deleted from a spin dial, list box, grid control, or text edit control via this element. Basic indexing is provided. Application programmers may incorporate a custom list into a control object using this element.

6. ElemSound: This element is used as a container for sounds. Application programmers may use this element to assign a discrete sound to a focus or control object. Each control object may be programmed to play a sound file when it either receives or loses the focus. For example, when a button receives the focus, it could make a soft click sound. Scrolling a list could be accompanied by a sliding sound. Transitory focus items may also have sounds associated with them. This element is particularly desirable in the interactive television environment because audio feedback adds communicative value to the viewer interface to help the viewer understand what is happening. Standard sounds are provided, or program modules may provide their own custom sounds.

Control Manager

Referring again to FIG. 7, the control manager 216 handles the linking and layering of control and focus items in the system. A focus object 206 may be linked to a control object, which becomes a parent container holding the focus object. An object known as TvTop is provided as a master container maintained by the control manager. Top-level frames (i.e., frames with no parent) are registered with TvTop so that the control manager can facilitate navigating and switching between applications when more than one application is running at a time.

The control manager may be distributed among control objects. The control manager handles registering and de-registering of control objects upon their creation, disabling, enabling, being made invisible, and being made visible. The control manager also handles associating the focus object with a control object when it receives the focus and handles de-associating the focus object from a control object when it loses the focus, when each control object is notified of changes in focus by the focus manager. The control manager also handles connecting the control object that receives the focus to the input and detaching the control object when the control object loses the focus.

The control manager also controls the appearance of a control item for the various states: disabled, enabled, selected, modal not activated, and modal activated. The appearance of each state is governed by configuration defining information for each state. The control manager may also start, synchronize, and stop animations associated with a control item when a control item receives or loses the focus or upon the occurrence of one or more input events in accordance with application program parameters specified for each control object. Within an application, the control object that had focus when the application was last active typically receives focus upon reactivation.

Visual Objects Manager

Referring again to FIG. 7, the visual object manager 217 controls the relative Z order among various applications and among various items within each application. While multiple applications are expected, only one copy of an application will preferably be running at one time. Selecting an application makes it the active application, which means the application is brought to the top of the Z order and, the focus is transferred to it.

Multiple objects can be rendered into one sprite, and multiple sprites can be located at the same point on the screen. Relative Z order and transparency determine which sprites, and which objects within sprites, are actually visible. The position of a sprite is controlled by the visual object manager and defined by relative X and Y position and a relative Z order. The visual object manager 217 passes the sprite's position information to the sprite manager 220. Various additional properties such as colors, borders, and additional contained elements which determine an item's appearance are rendered on the object's drawing surface, which is also passed to the sprite manager 220 by the visual objects manager 217.

Drawing Engine

Returning to FIG. 7, those skilled in the art will appreciate that control and focus items can be rendered using either a standard drawing engine or a 4-D (i.e., three spatial dimensions plus time) drawing engine 218 (e.g., based on "OpenGL"™). With this tool, it is possible to create true 3-D looking control items. Applications may specify the 3-D appearance of the control by using a 3-D data file to describe its appearance.

The focus and control items are rendered into sprites for manipulation in order to get high performance 2-D animation capabilities. These capabilities allow effects such as a button moving across the screen. Control over the hierarchy among control objects is separate from the control over the hierarchy of the sprites upon which control objects may be rendered. While the drawing of single or multiple control objects can have a true Z dimension (i.e., third spatial dimension), sprites are simply layered in Z order like a deck of cards with infinitely thin cards.

Sprite Manager

The sprite manager 220 renders the sprite drawing surfaces visible in a manner that supports the video driver 224. Each visual sprite preferably includes a display buffer and can have an independent pixel format (e.g., 8 bits per pixel palletized or 24 bits per pixel with 8 bits alpha for blending).

An individual object draws itself into a sprite's associated drawing surface using a collection of interfaces to the drawing engine 218. Direct access to the pixel buffer, which allows direct changes to the pixels in memory, is provided. Application writers can thus use specialized or custom drawing routines for any required functionality not provided by the standard graphics methods.

When rendering objects in the hierarchy, each successive object is drawn (on the same DIB if shared) in descending hierarchical order (back to front as viewed on the screen) until the last child is encountered. Note that when an object that owns its own sprite is encountered, it starts a new drawing surface for itself and all of its children that do not have their own sprites.

Because some televisions do not display all of the potential screen area that can be rendered by a preferred set-top terminal (i.e., 640 pixels by 480 pixels), an optional property can be set such that a frame and all of its children are scaled down to the video safe area which is 90% of the total display screen (i.e., 640 pixels by 480 pixels down to 576 pixels by 432 pixels). An application can still move a frame off screen by setting negative coordinates or coordinates larger than 640 pixels by 480 pixels. However, when the position or extent is set to values within the expected visible range, the sprite manager automatically positions and/or sizes the items such that they are rendered within the selected safe region. To avoid scaling, the application writer may design items to appear within the safe region without exceeding the limits.

Each element of an item displayed on the screen may be assigned its own sprite. For example, the spin dial body and left and right arrow elements can each be assigned their own sprites. Containership of multiple objects is generally supported although there are some practical exceptions. For example, only one list at a time is supported by a spin dial or list box. Nevertheless, there is wide flexibility. For example, a text element may have two different animator elements which allows multiple simultaneous animations using the standard animator elements. Audio and text animation elements may be included at the discretion of the application programmer and triggered as desired, typically when the associated control item is selected.

With multiple items drawn on a single display surface (i.e., with shared sprites), the apparent Z order of those objects is fixed and contiguous, back to front, parent to child, sibling to sibling. After all elements have been drawn, the sprite image is a single flat, 2-D drawing surface or plane. Moving sprites pass either entirely in front of or behind other sprites and the aggregate of all sharing items rendered therein.

In a sprite containing multiple elements, the entire buffer may be redrawn if any element is erased or changed. This technique is more memory efficient but requires redrawing the entire parent sprite upon any changes to any children. Those skilled in the art will appreciate that with multiple elements sharing a single sprite display surface enough memory might be saved so that double buffered drawing could be used to avoid flickering during redraw. A more efficient approach to redrawing sprites which are shared by multiple elements is to store information concerning which regions are "dirty" and need redrawing and which regions do not need redrawing. Such an approach to redrawing is used in common graphical user interfaces such as those interfaces produced by the "WINDOWS" operating system.

Preferably, child objects are not clipped at the boundaries of their parent. This is true even when items are sharing a sprite. This puts a bit more responsibility on the application writer to keep the screen from becoming discordant, especially with multiple applications running. However, this also gives great flexibility in design. For example, it allows interesting animation, such as children spiraling in from the edges of a screen and assembling to form a visually complete control. The only clipping enforced by default is at a sprite's drawing surface boundary. Because there is no fixed frame buffer, and the only available drawing surface is provided by sprites, it will be appreciated that the drawing engine cannot draw where there is no drawing surface.

It is preferred that applications establish as their base layer (i.e., top-level frame) an opaque background (which might be live video). This is recommended so that when the application is selected all of its control items are readily visible against this opaque background or on top of other control items contained by the application. Only during transitions and other effects should control items wander outside the application's established boundary. This is, however, only a preferred convention. There is nothing in this architecture that enforces the suggested behavior.

Note that there is built-in clipping as sprites pass in front of or behind each other during animations depending on their relative Z order. This is strictly a visual effect of the sprite system (i.e., a result of setting sprite screen or relative Z layer positions) and no other action is needed. The drawing surfaces remain intact when hidden behind other sprites and need not be redrawn when uncovered.

The sprite manager 220 may manipulate span lists or descriptors. By changing span descriptors, a sprite can be independently clipped to limit its visible region without having to redraw any item rendered by the sprite that was clipped. This allows visible sections to grow or shrink as desired. However, an explicit command from a program module is needed to set this clipping region and change it as desired for each sprite or object.

Sprites controlled by the sprite manager have a relative Z order, or layering, which is effectively controlled by the visual object manager 217. When added as a child, an object is layered in front of the parent. A given object can be inserted or moved to just before or after a specified sibling object or to on top or bottom of all siblings. This approach means an object cannot be behind its parent nor in front of any siblings inserted after it in the patent's list of children.

Z order is passed on to the sprite manager for objects that have their own sprites, but the sprite layer is a subset of the complete Z layer hierarchy maintained by the visual object manager 217. This is because a sprite can be shared by more than one control or focus object. In the latter case, the drawing or rendering of the objects sharing the sprite's drawing surface must be done in the correct order so that the layering within this sprite appears correct.

When objects have their relative Z order changed, all of their children automatically go to the new layer such that the relative position of the children is invariant. Thus, no other objects will interpose themselves in any child layering except if purposely inserted. When the relative Z layer of any object is changed, the visual object manager automatically updates the relative Z order of all affected children and their sprites by making necessary calls to the sprite manager.

The above described approach ensures that no two sprites or objects have the same Z level so that hardware behavior will not become unpredictable. This does not preclude sprite collision detection. The sprite manager can provide methods that allow sprite groups to be created for purposes of collision or overlap monitoring with associated notification.

Each sprite has a defined width and height (in pixels) and a pixel type (bits per pixel, format). A memory buffer is matched to the specified image size and pixel type. Additional properties of the control that affect the final appearance of a DIB when displayed include scale factors (horizontal and vertical) to allow resizing of the image without redrawing for fast zoom effects and per scan or per DIB alpha value. Per pixel alpha is also available, as noted previously, to render semi-transparent regions within the DIB. A filter flag determines whether or not the image will be filtered by the hardware anti flicker filter.

The X, Y position and Z order defines the absolute screen position of a sprite. An enabled flag is set to true if the sprite should be displayed. Sprites interface to an object with DIB properties providing a display buffer. Properties taken from the DIB include width, height, and pixel type. Sprites include an interface pointer to the control object that owns the sprite.

All active sprites are maintained by the sprite manager 220 and displayed by supporting hardware if present. The sprite manager generates span lists consisting of one entry per occupied scan line per sprite. These span lists are held in sorted Z order and are referenced by the video driver to actually render the scan lines with optional anti-flicker filtering and both per scan line and per pixel alpha channel blending applied.

The maximum size of a single DIB for display as a sprite is limited by the hardware resolution and is 640 pixels by 480 pixels for the preferred set-top terminal. If 2 MB of memory were available for rendering sprites on the screen and if a single application had a background frame that was not a full DIB (that is, was a compressed solid color rectangle), then approximately 200 additional sprites of size 120 by 80 pixels, in 8-bit palletized mode, could be created and displayed at the same time.

If a full background sprite is displayed in 24-bit mode, then 1.22 MB would be needed for this sprite alone. Full-color 24-bit images will probably need to be reserved for smaller sprites, or rendered sparingly, until memory becomes more ubiquitous and less expensive. 16-bit mode can be used to conserve memory, while providing greater color resolution, and will probably be acceptable for many applications where 8-bit palletized mode is insufficient.

Sprite locations, X, Y, and Z, are always absolute screen positions. X and Y refer to the Cartesian coordinates and Z refers to the Z order. Locations (X and Y) of items are normally relative to the object's parent. For parentless top-level frames, the position is relative to the screen, i.e. the same as absolute screen position.

Video and Audio Drivers

Those skilled in the art will appreciate that visual and audio display elements managed as described above can be used to drive video and audio display devices through video and audio drivers.

Computer Program

FIG. 9, including FIGS. 9A and 9B, shows a top level logical flow diagram for a computer-implemented process for controlling the items displayed by the graphical viewer interface for an interactive network system supporting interactive television programs. Referring now to FIGS. 1, 2, 4, 7, 8, and 9, the computer-implemented process or program 1000 begins at step 1101. In step 1101, the set-top terminal 48 is initialized upon system start-up, i.e., when the viewer powers-up the set-top terminal 48 typically by pressing the power key 112 of the remote control 80. Preferably, initialization of the set-top terminal 48 is conducted by the boot code 72 which is stored in the memory 64 and which initiates a request to the headend system 12 to down-load certain program modules, such as the operating system 66 and a "default" application program 68. In step 1102, the program module(s) are received by the set-top terminal 48 via the distribution network 16 and loaded into the memory 64. These program modules typically include control objects 210 and focus objects 208 that support the display of associated control and focus items by the graphical viewer interface 100 on the television screen 95. In turn, the viewer can control the operation of the set-top terminal and the operation of the program modules running on the set-top terminal by selecting a desired control item and executing the underlying control function represented by the selected control item.

Upon completion of loading operations, a computer-implemented routine 1200 registers the control objects and the focus related information for these program modules and displays the control items representing control objects 210 and the focus items associated with the focus object 208. Although the items displayed by this initial display are dependent upon the associated program module(s), it will be appreciated that this initial display can be implemented as a default version that is always presented upon initialization of the set-top terminal 48 unless a customized display is provided by other program modules. Routine 1200 is described in more detail with respect to FIG. 11.

During the registration process of routine 1200, a program module can call the focus manager 206 and pass information relating to the control items and the focus items to be displayed via the graphical viewer interface 100. Enabled control objects 210 are registered with the focus manager 206. Note that control objects, rather than the screen positions of the control items, are preferably registered with the focus manager. This approach facilitates changes in the position of control items that may be associated with animation. Accordingly, an enabled control object registers with the focus manager, and the focus manager interrogates the control object to ascertain the control item's current position on the display screen when it is needed. Likewise, the focus mode and the initial assignment of the focus (i.e., the control object initially having the focus) are preferably registered with the focus manager. In addition, the navigation mode, for example roam mode or tab mode, is initially registered with the focus manager during the routine 1200.

Control items representing enabled control objects, as well as certain control items associated with disabled control objects, can then be displayed by the graphical viewer interface 100. Thus, in response to routine 1200, the graphical viewer interface 100 can present for viewing a combination of control items and a focus item indicating which control item has received initial focus. This focus item is shown in FIG. 3 as a focus item 105 located proximate to the control item 102.

After completing the registration process and presenting an initial display of the graphical viewer interface 100, the set-top terminal 48 is now ready to accept a command from the input device 54. In step 1210, the system receives a command signal in response to the viewer's decision to conduct a desired control operation. Note that the steps shown on FIG. 9B, including the steps from 1210 to "END", are "distributed" in that they are executed only in the context of a control object having the focus. The control object having the focus can call upon system services 1300 and 1400 to assist in processing input and managing focus selections.

For many control operations, the remote control 80 can be used to transmit an infrared command signal to the set-top terminal 48. Typical command signals generated by the remote control 80 can include: (1) directional commands for moving the focus item between control items or for navigating a cursor along the graphical viewer interface typically in response to a viewer manipulating the thumbpad 114 on primary remote control 80, (2) an action command for initiating the execution of a desired function by a control item typically in response to a viewer depressing the action key 116 on primary remote control 80, (3) conventional television/VCR-related commands, (4) character-based input data, or (5) other dedicated keys on the remote control. The command signal affects the control item that currently has focus, i.e., the control item designated as having focus as a result of placing the focus item in association with this control item.

In step 1220, an inquiry is conducted to determine whether a control object that is holding the focus is in a "modal" state. A command signal may be treated as a modal command signal if the control item having focus is in the modal state. A control object that is in a modal state may respond to and thus "consume" a user input command signal. For example, a left or right directional command may cause a spin dial having the focus to scroll through its internal list of options. However, other commands may not be consumed by a control object in a modal state. For example, an up or down directional command may not be consumed by a spin dial but rather may cause the focus to be changed to an adjacent control object. Thus, the spin dial may consume a left or fight directional command but will not consume an up or down directional command. If a control object in the modal state has the focus at the time the of user command signal, the "YES" branch is followed from step 1220 to step 1222.

In step 1222, an inquiry is conducted to determine whether the control object in a modal state consumed the user input command signal. If the user command was consumed, the "YES" branch is followed to step 1225, and the control and the display of the control item associated with the control object are updated. For example, at step 1225 a spin dial having the focus may scroll through its internal list of options, and the spin dial may display the scrolling List to the viewer. From step 1225, the program returns to step 1210 where another user command may be processed. If the user command was not consumed, the "NO" branch is followed to step 1230.

In contrast, if a command signal is received by a control object that is not in a modal state, then the "NO" branch is followed from step 1220 to step 1230. At step 1230, it will be determined whether a non-modal directional command signal has been output by the input device 54.

More specifically, user commands that are not consumed by a control object in a modal state are further processed in step 1230 where an inquiry is conducted to determine whether the user command is a command other than a command that the system is configured to process as a potential focus changing event. Commands other than potential focus changing events may be processed without changing the focus. For example, an application may be responsive to an action command, a help command, or some other command for which the application program is configured. If the user command cannot be processed without potentially changing the focus, the "NO" branch is followed to routine 1300 where the control object that should have the focus is determined. Routine 1300 is explained in more detail with respect to FIG. 11.

Routine 1300 is followed to decision step 1320 where it is determined whether a change in the focus has been indicated by the user command. Specifically, if the control object identified in step 1300 is different than the control object currently holding the focus, then a change in the focus is indicated. If a change in the focus is indicated, the "YES" branch is followed to routine 1400 where the system is updated in response to the new control object having the focus. Routine 1400 is explained in more detail with respect to FIG. 12. After routine 1400, the system returns to step 1210 where another user command may be processed. If a change in focus is not indicated, the system returns after step 1320 to step 1210 where another user command may be processed.

If the user command may be processed without potentially changing the focus, the "YES" branch is followed from step 1230 to step 1500 where an inquiry is conducted to determine whether the user command is a valid action command. An action command signal is preferably produced by primary remote control 80 in response to a viewer depressing the action key 116. An action command can be associated with the activation of a control function that is associated with the control item holding the focus. Alternatively, an action command may change the state of the focus mode from a modal to a non-modal state or vice versa. If an action command has been transmitted, the "YES" branch is followed to step 1510, and the action command is executed. After step 1510, the system returns to step 1210 where another user command may be processed. If the user command is not a valid action command, the "NO" branch is followed to step 1520.

In step 1520, an inquiry is conducted to determine whether the user command is a valid help command. If the user command is a help action command, the "YES" branch is followed to step 1530, where the help command is executed. After step 1530 the system returns to step 1210 where another user command may be processed. If the user command is not a valid help command, the "NO" branch is followed to step 1540.

In step 1540, an inquiry is conducted to determine whether the user command is another valid command for which the application is configured. If the user command is another valid command, the "YES" branch is followed to step 1550 where the command is executed. After step 1550, the system returns to step 1210 where another user command may be processed. If the user command is not another valid command, the "NO" branch is followed to step 1560.

In step 1560, an inquiry is conducted to determine whether the user command is a valid end command. Because a "terminate" function is not assigned to a dedicated key on the primary remote control 80, the application program 68 preferably provides the viewer with a mechanism to dismiss or to close this program module. This can involve dismissing only the display component for application programs that run in the background, such as a stock quote, news filters, the program guide, and so forth. For example, one mechanism for terminating a program module is by turning off the electrical power to the set-top terminal 48. Alternatively, a viewer can discontinue the display of control items on the screen by entering a selected command or combination of command from the input device 54. If an end command is detected, the application program will terminate at the "END" step; otherwise, the process follows the "NO" branch and loops back to step 1210 to monitor for and obtain another command signal.

Those skilled in the art will appreciate that for as long as program 1000 is activated, it will continually loop through steps 1210–1560 to receive and act upon viewer input commands. Furthermore, it will be understood that a program module may also, at step 1200, cause the display of control and focus items on the screen to be changed at any time. New programming information loaded into the set-top terminal 48 from the headend system 12 may thus change the presentation of the control items and focus item on graphical viewer interface 100.

FIG. 10 is a logical flow diagram that illustrates the steps for the computer-implemented routine 1200, which is responsible for the registration and display of control and focus items. Referring now to FIGS. 1, 2, 4, 8, and 10, at step 1201, an inquiry is conducted to determine whether an initial control object 210 operates in the enabled state. Recall that a control object in the enabled state may receive the focus while a disabled or invisible control object may not. If the control object is enabled, the "YES" branch is followed from step 1201 to step 1202, and the control object 210 is registered with the focus manager 206. This enabled control object 210 is then presented as a control item to the viewer at step 1204 by the graphical viewer interface 100 on the display screen 95. The routine then continues to decision step 1206.

In contrast, if the initial control object 210 operates in the disabled state, rather than the enabled state, the "NO" branch is followed from step 1201 to step 1203. A determination is made in step 1203 to decide whether to display the control item for this disabled control item. If the response to this inquiry is positive, the control item for this disabled control object 210 is displayed in step 1205 by the graphical viewer interface 100 on the display screen 95. A disabled control item is typically displayed as a muted version of its enabled appearance signaling to the viewer that the control item is not enabled to receive the focus. The routine then continues to decision step 1206.

Likewise, if the response to the inquiry in step 1203 is negative, then the "NO" branch is followed to step 1206 without displaying the disabled control item.

In decision step 1206, an inquiry is made to determine whether other control objects 210 are available and are required to support the graphical viewer interface 100. If the response is positive, the "YES" branch is followed from step 1206 to step 1201, and another control item is examined to determine whether it is enabled and should be registered and displayed. Otherwise, the routine continues by following the "NO" branch to step 1207. In this manner, this loop of steps is followed until all control objects 210 created to support the graphical viewer interface 100 are processed by this routine.

After all of the control objects 210 have been processed in the manner described above, the focus mode (roam mode or tab mode) is registered with the focus manager 206 at step 1207. The active program module typically supplies this initial navigation mode information to the focus manager 206. Likewise, the control having initial focus is registered with the focus manager 206 at step 1208. This causes the focus manager 206 to execute routine 1400 which displays the control with focus along with the focus indicator.

Upon completion of routine 1200, the graphical viewer interface preferably presents control items, including a single focus item in association with an initial control item having the focus. The placement of the focus item in association with a control item thus indicates to the viewer which control object is initially selected. For example, FIG. 3A depicts the graphical viewer interface having three control items, namely control items 102, 103, and 104, and a single focus item represented by the focus ring 105 showing that control item 102 has the focus.

FIG. 11 is a logical flow diagram that illustrates the steps of the computer-implemented routine 1300 which is responsible for determining focus selection. Routine 1300 determines focus selection based upon whether the navigation mode is set to roam mode or tab mode. The navigation mode is initially registered with the focus manager 206 during the routine 1200. However, it will be appreciated that this initial registration of the navigation mode can be changed by a program module 202 in response to local input or an instruction downloaded to the set-top terminal 48 from the headend 12. In tab mode, the focus item can jump directly from one control item to another control item in response to a non-modal directional command signal. The list of registered control items is examined by the focus manager 206 to determine the control item that currently has focus and the control item that is to receive focus, i.e., the control item available to receive focus and located in the direction supplied by the non-modal directional command signal. The focus item can then be moved from its current location to a location associated with this selected control item.

Referring now to FIGS. 1, 2, 4, 8, and 11, at step 1301, an inquiry is conducted to determine whether the navigation mode is set to the roam mode. The navigation mode is preferably controlled by the active program module, such as an application program 68, and is initially registered with the focus manager 206 during operation of the routine 1200 (FIG. 10). If the navigation mode is set to the roam mode, the "YES" branch is followed from step 1301 to step 1302. The focus zone for the first control object in the registration list maintained by the focus manager 206 is determined in step 1302. A focus zone, which is also described as a gravity zone, is generally an area of the display screen defined around and encompassing the control item. A focus zone supports the easy navigation of the focus to a control object associated with the focus zone. Specifically, rather than having to locate the cursor directly over a desired control item, the focus zone shifts the focus when the viewer gets within the focus zone that is defined around that selected control item.

At step 1303, the cursor position is determined, and in step 1304, an interrogation is conducted to determine whether the cursor intersects the focus zone of the control object. In roam mode, a viewer "selects" a control object by placing the cursor within the focus zone of the desired control item. Thus, if the focus zone is intersected by the cursor, the "YES" branch is followed from step 1304, and routine 1300 returns to program step 1320 as shown on FIG. 9B. If it is not, the "NO" path is followed to step 1305 where it is determined whether there are more control objects to be examined. If there are more control objects in the registered list, the routing loops back to step 1302 to get the focus zone for the next control object in the registered list. Thus, the steps 1302 through 1305 will be looped through until the control object that should have the focus is identified or until all the control objects in the registration list have been examined.

In contrast, if the response in decision step 1301 is negative, then the navigation mode is set to tab mode, and the routine follows the "NO" branch to step 1306.

In tab mode, the focus can jump directly from one control item to another control item in response to command signals containing directional commands. This focus selection is represented by moving the focus item, such as the focus item 105 of FIG. 3A located near the control item 102 that initially has focus, to the location shown by focus item 105' in FIG. 3B located near the control item 104 that is to receive focus. In view of the foregoing, in step 1306, an inquiry is conducted to determine whether the user command is a directional command. If so, the current tab position is determined in step 1307, and the command signal containing the directional command is examined in step 1308. Based upon the direction for this directional command, the control item in the tab list intersecting this direction and located adjacent to the currently selected control item is identified. In step 1307, the present location of the focus item is determined based on the registration list maintained by the focus manager 206. The two pieces of information gathered in steps 1307 and 1308 serve to identify the present location of the focus item and the desired location of the focus item. Based on the information, in step 1309, the control item receiving focus is identified to support the transition of the focus item from the originally selected control item to this newly selected control item. If the user command is not a directional command, the command cannot be processed, and the "NO" branch is followed from step 1306 to the return step.

FIG. 12, including FIGS. 12A and 12B, is a logical flow diagram that illustrates the steps of routine 1400 for updating the display of the focus item on graphical viewer interface 100. Referring back to FIG. 9B, once the control item that should have the focus has been determined in step 1300, it is determined whether this indicates a change in focus in step 1320. If so, the computer-implemented routine 1400 updates the display of the focus item and the control items as presented by the graphical viewer interface 100. Regardless of whether the navigation mode is set to roam mode or tab mode, the updated display will generally include a visual cue to highlight the selection of the new control item having focus. In addition, if the navigation mode is set to the tab mode, then the updated display may further include a visual indicator of the remaining control items that are available for subsequent selection. In some circumstances, such as when the system is operating in the roam mode in certain contexts, the application may not explicitly show the object having the focus. In such circumstances, the user can explore the screen context using the cursor alone.

Referring now to FIGS. 2, 8, and 12, in routine 1410, the focus item associated with the control item currently holding the focus is discontinued. At routine 1420, the focus object 208 representing this focus item interrogates the control object 210 receiving the focus. During this interrogation, this control object 210 passes to the focus object parameters defining the position and configuration of the control item representing this control object 210. These parameters can include location of this selected control object 210 and the size and shape of this selected control object. In routine 1430, the focus item configured for the control item receiving the focus is displayed on the graphical viewer interface 100. In step 1440, the appearance of the control item may be changed to reflect the new state (i.e., holding focus), and in step 1450, the control object receiving the focus is registered for input events with the focus manager 206.

FIG. 12B shows the steps associated with routine 1410 for discontinuing the focus item associated with the control item currently holding the focus. In step 1411, the display of the control item is discontinued. In step 1412, the control object losing the focus is deregistered for input events with the focus manager 206. In step 413, the appearance of the control item associated with the control object may be changed to reflect the new state.

FIG. 13 is a logical flow diagram that illustrates the steps of computer-implemented routine 1420 for interrogating a control object 210. Referring now to FIGS. 2, 8, and 13, the focus object 208 can interrogate the control object 210 receiving focus to determine the position and parameters defining the size and shape of the control item representing this control object 210. In this manner, the focus item can be adapted, as required, to the size and shape of the control item. At step 1421, an inquiry is conducted to determine whether the control item receiving focus is a "visual" control item, i.e., a control item to be displayed for viewing. If not, the "NO" branch is followed, and an error message is returned at step 1422. However, if the control item receiving focus is a visual control item, then the "YES" branch is followed from step 1421 to step 1423. In step 1423, the focus object 208 obtains the position and the configuration of the control item receiving focus including the size and shape of this control item.

FIG. 14 is a logical flow diagram that illustrates the steps of computer-implemented routine 1430 for displaying a focus item associated with a control item holding focus. There are two ways for a custom focus item to be specified by the system: (1) on registering with the focus manager, a control object may specify a focus object to be used when that control object has the focus (note that the focus object may be passed to the control object by another program module prior to the control object registering with the focus manager), or (2) an application program module may monitor focus change events and render the appropriate focus item directly. The former approach is the preferred embodiment whereby the control object 210 contains information related to the display of the focus item. Therefore, in the preferred embodiment this information is retrieved at step 1423 (FIG. 13), and routine 1430 has all of the information it needs to animate the focus item. Accordingly, routine 1430 begins with routine 1431 wherein the focus item may be animated. The focus object and the control object having the focus are then linked in step 1438, and the routine returns.

FIG. 15 depicts the steps associated with animating the focus item, routine 1431, with more particularity. In step 1432, an inquiry is made to determine whether a transitional focus item should be displayed on graphical viewer interface 100. If the response is positive, the "YES" branch is followed from step 1432 to steps 1433 through 1435, and the transitional focus item is generated and displayed. Otherwise, the "NO" branch is followed, and routine 1431 moves to control step 1436.

If a transitional focus item is to be displayed, routine 1431 moves on to step 1433 where a transition path is determined. Referring back to FIG. 6, a focus path 142 is shown. Those skilled in the art will appreciate that the focus object may contain sophisticated logic for determining a focus transition path based on the display of the control items on the screen. The focus object may interface with the focus manager or other program modules in order to determine a focus transition path. At step 1434, the focus transition item may be animated while it moves along the transition path. In addition, the animation sequence will be responsive to logic contained in the focus object. The animation logic may alter the size of the transition focus item based on the size and location of control items on the screen or other parameters. Once the transition path and animation sequence have been determined, the animation of the transition of the focus item is displayed at step 1435. Routine 1431 moves to control step 1436.

At step 1436, the sequence of the animation displays for an animated focus item is determined. Referring back to FIG. 5, a sequence of displays associated with a simple animated focus item is illustrated. A focus item is shown in three different positions 110, 110', and 110" in FIGS. 5A, 5B, and 5C, respectively. Each position has associated with it an individual bit map corresponding to the picture that appears on the graphical viewer interface 100. The display of the focus item is sequentially changed between the three bit maps to create the animation effect. For example, the sequence may be position 1, position 2, position 3, position 3, position 2, position 1, position 1, etc. Once the focus animation sequence is determined at step 1436, the animated focus item is displayed on the screen at step 1437. Those skilled in the art will appreciate that sophisticated animation sequences including video and audio effects may be incorporated into a focus item at this point.

In view of the foregoing, the present invention addresses the need within the interactive network environment for a system for supplying information that allows a viewer to readily recognize which control function has been selected for operation. Within the interactive network environment, control items are presented by an output device such as a television display or monitor to represent the control functions for the interactive network. A focus item, which can be placed in association with a control item, supplies a visual indication of which control item has focus, i.e., the control item that has been currently selected by the viewer to enable the corresponding control function. The focus item can be programmed to include many forms of animation to draw the attention of the viewer. Thus, the present invention provides the advantages of highlighting a currently selected control item by using an animated focus item when the control and focus items are displayed over an active television video.

It should be understood that the foregoing relates only to the preferred embodiment of the present invention and that numerous changes may be made therein without departing from the spirit and scope of the invention as defined by the following claims.

What is claimed is:

1. In a computer system including a memory, a display screen, and a user input device, a method for communicating to a user that a control item displayed on the display screen is in a state responsive to signals from said user input device, comprising the steps of:

displaying a first control item on the display screen;
determining that the first control item is to have the focus;
displaying a first focus item on the display screen in association with the first control item;
displaying a second control item on the display screen;
receiving a command to change the focus to the second control item;
determining a path on the display screen from the first control item to the second control item;
discontinuing the display of the first focus item in association with the first control item;
generating a transitory focus item for display along the path;
displaying the transitory focus item on the display screen moving along the path from the first control item to the second control item;
discontinuing the display of the transitory focus item; and
displaying a second focus item on the display screen in association with the second control item.

2. The method of claim 1, wherein the step of displaying the first focus item further comprises animating the focus item.

3. The method of claim 1, further comprising the step of emitting a sound in association with the display of the first focus item on the display screen.

4. The method of claim 1, wherein the step of displaying the first focus item comprises altering the appearance of the first control item.

5. The method of claim 1, wherein the step of displaying the first focus item comprises displaying an image within the area defined by the boundaries of the first control item.

6. The method of claim 1, wherein the step of displaying the first focus item comprises displaying an image in an area of the display screen adjacent to the area in which the first control item is displayed.

7. The method of claim 1, wherein the step of displaying the first focus item comprises displaying an image partially in the area defined by the boundaries of the first control item and partially outside the area defined by the boundaries of the first control item.

8. The method of claim 1, wherein the transitory focus item is animated.

9. The method of claim 1, further comprising the step of emitting a sound in association with the display of the transitory focus item on the display screen.

10. The method of claim 1, wherein the command is a signal from the user input device caused by the action of the user.

11. The method of claim 10, wherein the step of receiving a user command comprises the steps of:

displaying a cursor on the display screen;
manipulating the position of the cursor on the display screen in response to a signal from the user input device caused by the action of the user;
comparing the position of the second control item on the display screen and the position of the cursor on the display screen; and
determining whether the cursor is in a focus zone associated with the second control item.

12. The method of claim 11, further comprising the step of determining whether the second control item is enabled for receiving focus.

13. The method of claim 1, further comprising the steps of:

calling an interface supported by a control object associated with said first control item, and
specifying parameters utilized by the control object to cause the control object to provide configuration defining information relating to the first control item.

14. The method of claim 13, wherein the configuration defining information includes the size and shape of the first control item on the display screen.

15. The method of claim 13, wherein the configuration defining information includes the location of the first control item on the display screen.

16. The method of claim 13, wherein the configuration defining information includes information identifying an animation to be displayed in association with the first control item.

17. The method of claim 13, wherein the configuration defining information includes information indicating that the transitory focus item should be displayed.

18. The method of claim 13, wherein the second control item is a manifestation of at least one control object operative for receiving commands and causing the second control item to be displayed on the display screen in response to a predefined command.

19. A computer system operative for communicating to a user that a control item is in a state responsive to user commands, comprising:

a user input device for providing said user commands;

a memory;

a display screen for displaying said control item; and a processing unit operative for:

determining that the first control item is to have the focus;

displaying a first focus item on the display screen in association with the first control item;

displaying a second control item on the display screen;

receiving a command to change the focus to the second control item;

determining a path on the display screen from the first control item to the second control item;

discontinuing the display of the first focus item in association with the first control item;

generating a transitory focus item for display along the path;

displaying the transitory focus item on the display screen moving along the path from the first control item to the second control item;

discontinuing the display of the transitory focus item; and displaying a second focus item on the display screen in association with the second control item.

20. The system of claim 19, wherein the first focus item is non static.

21. The system of claim 19, wherein said processing unit is further operative for emitting a sound in association with the display of the first focus item on said display screen.

22. The system of claim 19, wherein said processing unit is further operative for altering the appearance of the first control item in connection with displaying the first focus item.

23. The system of claim 19, wherein the first focus item comprises an image displayed within an area defined by the boundaries of the first control item.

24. The system of claim 19, wherein the first focus item comprises an image displayed in an area of the display screen adjacent to the area in which the first control item is displayed.

25. The system of claim 19, wherein the first focus item comprises an image partially in the area defined by the boundaries of the first control item and partially outside the area defined by the boundaries of the first control item.

26. The system of claim 19, wherein said transitory focus item is non static.

27. The system of claim 19, wherein said processing unit is further operative for emitting a sound in association with the display of said transitory focus item on said display screen.

28. The system of claim 19, wherein said command is a signal from said user input device caused by the action of the user.

29. The system of claim 28, wherein said processing unit is further operative for:

displaying a cursor on said display screen;

manipulating the position of the cursor on said display screen in response to a signal from said user input device caused by the action of the user;

comparing the position of said second control item on said display screen and the position of the cursor on said display screen; and determining whether the cursor is in a focus zone associated with said second control item.

30. The system of claim 29, wherein said processing unit is further operative for determining whether said second control item is enabled for receiving focus.

31. The system of claim 19, wherein said processing unit is further operative for:

calling an interface supported by a control object associated with said first control item, and specifying parameters utilized by said control object to cause said control object to provide configuration defining information relating to the first control item.

32. The system of claim 31, wherein said configuration defining information includes the size and shape of the first control item on said display screen.

33. The system of claim 31, wherein said configuration defining information includes the location of the first control item on the display screen.

34. The system of claim 31, wherein said configuration defining information includes information identifying an animation to be displayed in association with the first control item.

35. The system of claim 31, wherein said configuration defining information includes information indicating that the transitory focus item should be displayed.

36. The system of claim 31, wherein the second control item is a manifestation of at least one control object operative for receiving commands and causing the second control item to be displayed on said display screen in response to a predefined command.

37. In an interactive television system for bi-directional communication including a headend system, a memory, a display screen, and a user input device, a method for communicating to a user that a control item is in a state responsive to signals from the user input device for causing a communication to be transmitted from a user to the headend system and for manipulating the state of the control item, comprising the steps of:

displaying on the display screen a television program transmitted by the headend system;

displaying on the display screen a control item having a configuration;

receiving from the headend system configuration defining information relating to the television program;

generating a focus item that has a configuration based on the configuration of the control item and on the configuration defining information relating to the television program; and displaying the focus item on the display screen simultaneously and in association with the control item.

38. The method of claim 37, wherein the focus item is non static.

39. The method of claim 37, further comprising the step of emitting a sound in association with the display of the focus item on the display screen.

40. The method of claim 37, wherein the step of displaying the focus item comprises altering the appearance of the control item.

41. The method of claim 37, wherein the step of displaying the focus item comprises displaying an image within the area defined by the boundaries of the control item.

42. The method of claim 37, wherein the step of displaying the focus item comprises displaying an image in an area of the display screen adjacent to the area in which the control item is displayed.

43. The method of claim 37, wherein the step of displaying the focus item comprises displaying an image partially in the area defined by the boundaries of the control item and partially outside the area defined by the boundaries of the control item.

44. The method of claim 37, wherein the control item is a first control item and the focus item is a first focus item, and further comprising the steps of:
 displaying on the display screen a second control item transmitted by the headend system;
 receiving a command;
 in response to the command:
  discontinuing the display of the first focus item in association with the first control item;
  determining that the second control item should receive focus;
  generating a second focus item that has a configuration based on the configuration defining information relating to the television; and
  displaying the second focus item on the display screen in association with the second control item.

45. The method of 44, further comprising the steps of:
 determining a path on the display screen from the first control item to the second control item;
 generating a transitory focus item for display along the path; and
 displaying the transitory focus item on the display screen.

46. The method of claim 45, wherein the transitory focus item is non static and has a configuration based on the configuration defining information relating to the television program.

47. The method of claim 45, further comprising the step of emitting a sound in association with the display of the transitory focus item on the display screen.

48. The method of claim 44, wherein the command is a directional command from the user input device caused by the action of the user.

49. The method of claim 48, wherein the step of receiving a directional command comprises the steps of:
 displaying a cursor on the display screen;
 manipulating the position of the cursor on the display screen in response to a signal from the user input device caused by the action of the user;
 comparing the position of the second control item on the display screen and the position of the cursor on the display screen; and
 determining whether the cursor is in a focus zone associated with the second control item.

50. The method of claim 49, further comprising the step of determining whether the second control item is enabled for receiving focus.

51. The method of claim 44 further comprising the steps of:
 calling an interface supported by a control object associated with the control item, and
 specifying parameters utilized by the control object to cause the control object to provide control item defining information relating to attributes of the control item.

52. The method of claim 44, wherein the control item defining information includes the size and shape of the control item on the display screen.

53. The method of claim 44, wherein the control item defining information includes the location of the control item on the display screen.

54. The method of claim 44, wherein the control item defining information includes information identifying an animation to be displayed in association with the control item.

55. The method of claim 44, wherein the control item defining information includes information indicating that a transitory focus item should be displayed.

56. The method of claim 44, wherein the control item is a manifestation of at least one control object operative for receiving commands and causing the control item to be displayed on the display screen in response to a predefined command.

57. The method of claim 37, further comprising the step of:
 receiving a signal from the user input device caused by the action of the user; and
 in response to the signal, transmitting a message associated with the control item to the headend system.

58. The method of claim 57, wherein the focus item is non static.

59. The method of claim 57, further comprising the step of emitting a sound in association with the display of the focus item on the display screen.

60. The method of claim 57, wherein the step of displaying the focus item comprises altering the appearance of the control item.

61. The method of claim 57, wherein the step of displaying the focus item comprises displaying an image within the area defined by the boundaries of the control item.

62. The method of claim 57, wherein the step of displaying the focus item comprises displaying an image in an area of the display screen adjacent to the area in which the control item is displayed.

63. The method of claim 57, wherein the step of displaying the focus item comprises displaying an image partially in the area defined by the boundaries of the control item and partially outside the area defined by the boundaries of the control item.

64. The method of claim 57, wherein the control item is a first control item and the focus item is a first focus item, and further comprising the steps of:
 displaying on the display screen a second control item transmitted by the headend system;
 receiving a command;
 in response to the command:
  discontinuing the display of the first focus item in association with the first control item;
  determining that the second control item should receive focus;
  generating a second focus item that has a configuration based on the configuration defining information relating to the television; and displaying the second focus item on the display screen in association with the second control item.

65. The method of 64, further comprising the steps of:

determining a path on the display screen from the first control item to the second control item;

generating a transitory focus item for display along the path; and displaying the transitory focus item on the display screen.

66. The method of claim 65, wherein the transitory focus item is non static.

67. The method of claim 65, further comprising the step of emitting a sound in association with the display of the transitory focus item on the display screen.

68. The method of claim 64, wherein the command is a directional command from the user input device caused by the action of the user.

69. The method of claim 68, wherein the step of receiving a directional command comprises the steps of:

displaying a cursor on the display screen;

manipulating the position of the cursor on the display screen in response to a signal from the user input device caused by the action of the user;

comparing the position of the second control item on the display screen and the position of the cursor on the display screen; and determining whether the cursor is in a focus zone associated with the second control item.

70. The method of claim 69, further comprising the step of determining whether the second control item is enabled for receiving focus.

71. The method of claim 64 further comprising the steps of:

calling an interface supported by a control object associated with the control item, and specifying parameters utilized by the control object to cause the control object to provide control item defining information relating to attributes of the control item.

72. The method of claim 64, wherein the control item defining information includes the size and shape of the control item on the display screen.

73. The method of claim 64, wherein the control item defining information includes the location of the control item on the display screen.

74. The method of claim 64, wherein the control item defining information includes information identifying an animation to be displayed in association with the control item.

75. The method of claim 64, wherein the c control item defining information includes information indicating that a transitory focus item should be displayed.

76. The method of claim 64, wherein the control item is a manifestation of at least one control object operative for receiving commands and causing the control item to be displayed on the display screen in response to a predefined command.

77. In an interactive television system for bi-directional communication including a headend system, a memory, a display screen, and a user input device, a method for communicating to a user that a control item is in a state responsive to signals from the user input device for causing a communication to be transmitted from a user to the headend system and for manipulating the state of the control item, comprising the steps of:

displaying on the display screen a television program transmitted by the headend system;

displaying on the display screen first and second control items, each having a configuration;

receiving from the headend system configuration defining information relating to the television program;

generating a first focus item with a configuration based on the configuration of the first control item and on the configuration defining information relating to the television program;

displaying on the display screen the first focus item simultaneously and in association with the first control item;

displaying on the display screen at least one cursor under the control of the user via the user input device;

manipulating the position of the cursor on the display screen in response a signal from the user input device caused by the action of the user;

in response to a predetermined relation between the position of the second control item on the display screen and the position of the cursor on the display screen:

discontinuing the display of the first focus item;

generating a second focus item with a configuration based on the configuration of the second control item and on the configuration defining information relating to the television program; and displaying on the display screen the second focus item simultaneously and in association with the second control item.

* * * * *

UNITED STATES PATENT AND TRADEMARK OFFICE
CERTIFICATE OF CORRECTION

PATENT NO. : 5,687,331
DATED : November 11, 1997
INVENTOR(S) : Patrick M. Volk, Michael Breed Robin, Edwin Thorne III, and JoGene Kapell It is certified that error appears in the above-identified patent and that said Letters Patent is hereby corrected as shown below:

Column 47, line number 34, claim number 44 as follows:
After "television", insert --program--

Column 48, line number 67, claim number 64 as follows:
After "television", insert -- program--

Signed and Sealed this

Twenty-third Day of February, 1999

Attest:

Q. TODD DICKINSON

Attesting Officer

Acting Commissioner of Patents and Trademarks